United States Patent
Sinha et al.

(10) Patent No.: US 11,733,761 B2
(45) Date of Patent: Aug. 22, 2023

(54) METHODS AND APPARATUS TO MANAGE POWER AND PERFORMANCE OF COMPUTING DEVICES BASED ON USER PRESENCE

(71) Applicant: Intel Corporation, Santa Clara, CA (US)

(72) Inventors: Vishal Sinha, Portland, OR (US); Paul Diefenbaugh, Portland, OR (US); Kristoffer Fleming, Chandler, AZ (US); Raoul Rivas Toledano, Beaverton, OR (US); Deepak Samuel Kirubakaran, Hillsboro, OR (US); William Braun, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 109 days.

(21) Appl. No.: 16/728,899

(22) Filed: Dec. 27, 2019

(65) Prior Publication Data
US 2020/0133374 A1    Apr. 30, 2020

Related U.S. Application Data

(60) Provisional application No. 62/933,944, filed on Nov. 11, 2019.

(51) Int. Cl.
*G06F 1/32* (2019.01)
*G06F 1/3231* (2019.01)
(Continued)

(52) U.S. Cl.
CPC ............ *G06F 1/3231* (2013.01); *G06F 3/013* (2013.01); *G06F 3/0304* (2013.01)

(58) Field of Classification Search
CPC ....... G06F 1/3231; G06F 3/013; G06F 3/0304
(Continued)

(56) References Cited

U.S. PATENT DOCUMENTS

D324,036 S      2/1992   Wakasa
5,173,940 A  *  12/1992  Lantz .................... G06F 1/3218
                                                      345/172
(Continued)

FOREIGN PATENT DOCUMENTS

CN      102197349    9/2011
CN      107077184    8/2017
(Continued)

OTHER PUBLICATIONS

International Searching Authority, "Written Opinion," issued in connection with International Patent Application No. PCT/CN2019/079790, dated Jan. 3, 2020, 4 pages.
(Continued)

*Primary Examiner* — Zahid Choudhury
(74) *Attorney, Agent, or Firm* — Hanley, Flight & Zimmerman, LLC

(57) ABSTRACT

Methods and apparatus to manage power and performance of computing devices based on user presence are disclosed. An apparatus includes an engagement detector to determine an engagement of a user with a device based on at least one of image data generated by an image sensor or an application running on the device; and an operation mode selector to select one of a plurality of operation modes for the device based on a level of engagement of the user, the plurality of operation modes including (1) a first operation mode associated with the device operating at a first performance level and a first power level and (2) a second operation mode associated with the device operating at a second performance level and a second power level, the first performance (Continued)

level being higher than the second performance level, the first power level being higher than the second power level.

36 Claims, 10 Drawing Sheets

(51) Int. Cl.
*G06F 3/01* (2006.01)
*G06F 3/03* (2006.01)

(58) Field of Classification Search
USPC .............................. 713/300, 310, 320, 330
See application file for complete search history.

(56) References Cited

U.S. PATENT DOCUMENTS

| | | |
|---|---|---|
| D359,275 S | 6/1995 | Yamazaki |
| D376,791 S | 12/1996 | Schreiner |
| D388,774 S | 1/1998 | Giuntoli |
| D389,129 S | 1/1998 | Guintoli |
| D433,024 S | 10/2000 | Oross |
| D434,773 S | 12/2000 | Suzuki |
| D444,462 S | 7/2001 | Tsuji |
| D449,307 S | 10/2001 | Amano et al. |
| D453,508 S | 2/2002 | Shibata |
| D454,126 S | 3/2002 | Bliven et al. |
| D462,967 S | 9/2002 | Suzuki |
| D478,089 S | 8/2003 | Yokota |
| D480,089 S | 9/2003 | Skinner et al. |
| 6,657,647 B1 | 12/2003 | Bright |
| 6,760,649 B2 | 7/2004 | Cohen |
| D494,161 S | 8/2004 | Sawaquchi |
| D504,129 S | 4/2005 | Loew et al. |
| D517,542 S | 3/2006 | Lee et al. |
| D518,042 S | 3/2006 | Kanayama |
| D534,531 S | 1/2007 | Ogasawara |
| 7,386,799 B1 | 6/2008 | Clanton et al. |
| D577,013 S | 9/2008 | Harris et al. |
| D591,737 S | 5/2009 | Morooka et al. |
| 7,559,034 B1 | 7/2009 | Paperny et al. |
| D607,449 S | 1/2010 | Morisawa |
| D608,380 S | 1/2010 | Nagase et al. |
| D611,043 S | 3/2010 | Andre et al. |
| D611,045 S | 3/2010 | Andre et al. |
| D612,830 S | 3/2010 | Kim et al. |
| D614,180 S | 4/2010 | Gou |
| D616,433 S | 5/2010 | Morishita et al. |
| 7,725,547 B2 | 5/2010 | Albertson et al. |
| D616,882 S | 6/2010 | Denhez et al. |
| D631,039 S | 1/2011 | Sakai et al. |
| 7,971,156 B2 | 6/2011 | Albertson et al. |
| D645,857 S | 9/2011 | Cho et al. |
| 8,139,032 B2 | 3/2012 | Su et al. |
| D659,134 S | 5/2012 | Ahn et al. |
| D672,765 S | 12/2012 | Masui et al. |
| D673,558 S | 1/2013 | Cruz et al. |
| D674,382 S | 1/2013 | Andre et al. |
| D684,570 S | 6/2013 | Akana et al. |
| D687,831 S | 8/2013 | Kim |
| 8,566,696 B1 | 10/2013 | Hamon et al. |
| D692,875 S | 11/2013 | Lawrence |
| 8,581,974 B2 | 11/2013 | Lin et al. |
| D698,348 S | 1/2014 | Ilchan et al. |
| D704,185 S | 5/2014 | Bowers et al. |
| 8,717,318 B2 | 5/2014 | Anderson et al. |
| D706,767 S | 6/2014 | Kawai et al. |
| D706,768 S | 6/2014 | Kawai |
| D706,769 S | 6/2014 | Kawai et al. |
| D706,772 S | 6/2014 | Koyama et al. |
| D708,178 S | 7/2014 | Honda et al. |
| D708,179 S | 7/2014 | Andre et al. |
| D709,491 S | 7/2014 | Kurimoto et al. |
| 8,812,831 B2 | 8/2014 | Cheng et al. |
| D712,971 S | 9/2014 | Huang |
| D715,793 S | 10/2014 | Tsao et al. |
| D716,795 S | 11/2014 | Huang et al. |
| D718,818 S | 12/2014 | Sumii et al. |
| D720,712 S | 1/2015 | Park et al. |
| 8,954,884 B1 | 2/2015 | Barger |
| D724,576 S | 3/2015 | Wolff et al. |
| 8,994,847 B2 | 3/2015 | Chen et al. |
| D727,314 S | 4/2015 | Fukuoka |
| D729,227 S | 5/2015 | Fukuoka |
| D729,228 S | 5/2015 | Kawai |
| D729,229 S | 5/2015 | Kurimoto et al. |
| D729,791 S | 5/2015 | Adamson et al. |
| D729,792 S | 5/2015 | Kurimoto et al. |
| D731,475 S | 6/2015 | Mehandjiysky et al. |
| D739,398 S | 9/2015 | Adamson et al. |
| D739,399 S | 9/2015 | Adamson et al. |
| D739,400 S | 9/2015 | Adamson et al. |
| D740,278 S | 10/2015 | Bowers et al. |
| D741,318 S | 10/2015 | Oakley |
| D746,809 S | 1/2016 | Takada et al. |
| 9,268,434 B2 | 2/2016 | Sultenfuss et al. |
| D751,062 S | 3/2016 | Chang |
| 9,311,909 B2 | 4/2016 | Giaimo, III et al. |
| 9,436,241 B2 | 9/2016 | Tang et al. |
| D769,251 S | 10/2016 | Chen |
| D771,684 S | 11/2016 | Kim |
| D780,173 S | 2/2017 | Matsuoka |
| 9,575,559 B2 | 2/2017 | Andrysco |
| D780,760 S | 3/2017 | Ironmonger et al. |
| D788,767 S | 6/2017 | Magi |
| D794,027 S | 8/2017 | Ironmonger et al. |
| 9,721,383 B1 | 8/2017 | Horowitz et al. |
| 9,740,290 B2 | 8/2017 | Rosenberg et al. |
| 9,766,700 B2 | 9/2017 | Lyons et al. |
| 9,785,234 B2 | 10/2017 | Horesh |
| D801,945 S | 11/2017 | Cho et al. |
| D803,946 S | 11/2017 | Matsuda |
| 9,846,471 B1 | 12/2017 | Arora |
| D810,069 S | 2/2018 | Hishiki |
| D810,071 S | 2/2018 | Hishiki |
| D813,235 S | 3/2018 | Rosenberg et al. |
| D814,469 S | 4/2018 | Rundberg |
| D816,083 S | 4/2018 | Wu |
| 9,936,195 B2 | 4/2018 | Horesh |
| 9,996,638 B1 | 6/2018 | Holz et al. |
| D823,850 S | 7/2018 | Lim et al. |
| 10,027,662 B1 | 7/2018 | Mutagi et al. |
| D825,435 S | 8/2018 | Yu |
| 10,101,817 B2 | 10/2018 | Hsin et al. |
| 10,234,928 B2 | 3/2019 | Chen |
| 10,254,178 B2 | 4/2019 | Carbone et al. |
| 10,262,599 B2 | 4/2019 | Lang et al. |
| 10,304,209 B2 | 5/2019 | Alonso |
| 10,415,286 B1 | 9/2019 | Porcella et al. |
| D867,460 S | 11/2019 | Yan et al. |
| D873,835 S | 1/2020 | Chan |
| 10,551,888 B1 | 2/2020 | North et al. |
| D878,475 S | 3/2020 | Letter |
| D879,777 S | 3/2020 | Cho |
| 10,620,457 B2 | 4/2020 | Ain-Kedem |
| 10,620,786 B2 | 4/2020 | Veeramani et al. |
| D886,112 S | 6/2020 | Yeh et al. |
| 10,725,510 B2 | 7/2020 | Ho et al. |
| 10,740,912 B2 | 8/2020 | Ren et al. |
| 10,768,724 B1 | 9/2020 | Han |
| 10,819,920 B1 | 10/2020 | Hamlin et al. |
| 10,884,479 B2 | 1/2021 | Chen |
| D914,021 S | 3/2021 | Magi et al. |
| 11,153,472 B2 * | 10/2021 | Konicek ................. G03B 13/02 |
| 11,194,398 B2 | 12/2021 | Bernhart |
| 11,360,528 B2 * | 6/2022 | Mishra ..................... G06F 1/206 |
| 11,379,016 B2 | 7/2022 | Cooper et al. |
| 11,543,873 B2 | 1/2023 | Sengupta et al. |
| 2002/0089190 A1 | 7/2002 | Wang et al. |
| 2002/0091738 A1 | 7/2002 | Rohrabaugh et al. |
| 2003/0043174 A1 | 3/2003 | Hinckley et al. |
| 2003/0174149 A1 | 9/2003 | Fujisaki et al. |
| 2004/0158739 A1 * | 8/2004 | Wakai .................. G06Q 10/107 |
| | | 726/28 |

(56) References Cited

U.S. PATENT DOCUMENTS

| | | |
|---|---|---|
| 2004/0175020 A1 | 9/2004 | Bradski et al. |
| 2004/0252101 A1 | 12/2004 | Wilk |
| 2005/0071698 A1 | 3/2005 | Kangas |
| 2006/0146030 A1 | 7/2006 | Kim |
| 2006/0192775 A1 | 8/2006 | Nicholson et al. |
| 2007/0228138 A1 | 10/2007 | Huang et al. |
| 2008/0046425 A1 | 2/2008 | Perski |
| 2008/0112571 A1 | 5/2008 | Bradicich et al. |
| 2008/0158144 A1 | 7/2008 | Schobben et al. |
| 2008/0301300 A1 | 12/2008 | Toub |
| 2009/0092293 A1* | 4/2009 | Lin .................. G06F 1/3231 382/118 |
| 2009/0165125 A1 | 6/2009 | Brown et al. |
| 2010/0039376 A1 | 2/2010 | Wang |
| 2010/0079508 A1 | 4/2010 | Hodge et al. |
| 2010/0281432 A1 | 11/2010 | Geisner et al. |
| 2011/0055752 A1 | 3/2011 | Rubinstein et al. |
| 2011/0154266 A1 | 6/2011 | Friend et al. |
| 2011/0175932 A1 | 7/2011 | Yu et al. |
| 2011/0248918 A1 | 10/2011 | Yoo et al. |
| 2011/0252339 A1 | 10/2011 | Lemonik et al. |
| 2011/0273546 A1 | 11/2011 | Lin et al. |
| 2011/0296163 A1 | 12/2011 | Abernethy et al. |
| 2011/0298702 A1 | 12/2011 | Sakata et al. |
| 2011/0298967 A1* | 12/2011 | Clavin .................. G06F 1/3231 323/318 |
| 2012/0032894 A1 | 2/2012 | Parivar et al. |
| 2012/0054670 A1 | 3/2012 | Rainisto |
| 2012/0062470 A1 | 3/2012 | Chang |
| 2012/0123680 A1 | 5/2012 | Wipplinger et al. |
| 2012/0171656 A1 | 7/2012 | Shen |
| 2012/0172085 A1 | 7/2012 | Vuppu et al. |
| 2012/0249429 A1 | 10/2012 | Anderson et al. |
| 2012/0300061 A1 | 11/2012 | Osman et al. |
| 2012/0319997 A1 | 12/2012 | Majumder |
| 2013/0007096 A1 | 1/2013 | Pahlavan et al. |
| 2013/0007590 A1 | 1/2013 | Rivera et al. |
| 2013/0021750 A1 | 1/2013 | Senator! |
| 2013/0120460 A1 | 5/2013 | Adams et al. |
| 2013/0158999 A1 | 6/2013 | Maruta et al. |
| 2013/0173946 A1* | 7/2013 | Rotem .................. G06F 1/3206 713/340 |
| 2013/0174016 A1 | 7/2013 | Glazer et al. |
| 2013/0185633 A1 | 7/2013 | Bunker et al. |
| 2013/0207895 A1 | 8/2013 | Lee et al. |
| 2013/0212462 A1 | 8/2013 | Athas et al. |
| 2013/0222329 A1 | 8/2013 | By et al. |
| 2013/0283213 A1 | 10/2013 | Guendelman et al. |
| 2013/0289792 A1 | 10/2013 | Cheng et al. |
| 2013/0321265 A1 | 12/2013 | Bychkov et al. |
| 2013/0321271 A1 | 12/2013 | Bychkov et al. |
| 2013/0332760 A1* | 12/2013 | Reece .................. G06F 1/329 713/323 |
| 2014/0006830 A1 | 1/2014 | Kamhi et al. |
| 2014/0028548 A1 | 1/2014 | Bychkov et al. |
| 2014/0050360 A1 | 2/2014 | Lin et al. |
| 2014/0085451 A1 | 3/2014 | Kamimura et al. |
| 2014/0089865 A1 | 3/2014 | Gay et al. |
| 2014/0129937 A1 | 5/2014 | Jarvinen et al. |
| 2014/0132508 A1 | 5/2014 | Hodge et al. |
| 2014/0139456 A1 | 5/2014 | Wigdor et al. |
| 2014/0149935 A1 | 5/2014 | Johnson et al. |
| 2014/0189579 A1 | 7/2014 | Rimon et al. |
| 2014/0191995 A1 | 7/2014 | Karpin et al. |
| 2014/0201690 A1 | 7/2014 | Holz |
| 2014/0208260 A1 | 7/2014 | Kawahara et al. |
| 2014/0258942 A1 | 9/2014 | Kutliroff et al. |
| 2014/0267021 A1 | 9/2014 | Lee et al. |
| 2014/0281918 A1 | 9/2014 | Wei et al. |
| 2014/0313120 A1 | 10/2014 | Kamhi |
| 2014/0361977 A1 | 12/2014 | Stafford et al. |
| 2014/0372511 A1 | 12/2014 | Kapadia et al. |
| 2014/0380075 A1* | 12/2014 | Pulapaka .............. G06F 1/3293 713/323 |
| 2015/0009238 A1 | 1/2015 | Kudalkar |
| 2015/0015688 A1 | 1/2015 | Yang |
| 2015/0042572 A1 | 2/2015 | Lombardi et al. |
| 2015/0058649 A1 | 2/2015 | Song et al. |
| 2015/0100884 A1 | 4/2015 | Ryu et al. |
| 2015/0121193 A1 | 4/2015 | Beveridge et al. |
| 2015/0121287 A1 | 4/2015 | Fermon |
| 2015/0177843 A1 | 6/2015 | Kwon |
| 2015/0185909 A1 | 7/2015 | Gecnuk |
| 2015/0193395 A1 | 7/2015 | Nicolaou et al. |
| 2015/0220149 A1 | 8/2015 | Plagemann et al. |
| 2015/0220150 A1 | 8/2015 | Plagemann et al. |
| 2015/0248167 A1 | 9/2015 | Turbell et al. |
| 2015/0264572 A1 | 9/2015 | Turgeman |
| 2015/0360567 A1 | 12/2015 | Sannomiya et al. |
| 2015/0363070 A1 | 12/2015 | Katz |
| 2016/0034019 A1* | 2/2016 | Seo .................. G06F 1/3231 345/593 |
| 2016/0062584 A1 | 3/2016 | Cohen et al. |
| 2016/0087981 A1 | 3/2016 | Dorresteijn |
| 2016/0091938 A1 | 3/2016 | Edwards et al. |
| 2016/0109961 A1 | 4/2016 | Parshionikar |
| 2016/0116960 A1 | 4/2016 | Kwak et al. |
| 2016/0132099 A1 | 5/2016 | Grabau et al. |
| 2016/0170617 A1 | 6/2016 | Shi et al. |
| 2016/0179767 A1 | 6/2016 | Mavinakuli et al. |
| 2016/0180762 A1 | 6/2016 | Bathiche et al. |
| 2016/0187994 A1 | 6/2016 | La et al. |
| 2016/0202750 A1* | 7/2016 | Pulapaka .............. G06F 1/329 713/323 |
| 2016/0212317 A1 | 7/2016 | Alameh et al. |
| 2016/0232701 A1 | 8/2016 | Drozdyuk |
| 2016/0259467 A1 | 9/2016 | Nayyar et al. |
| 2016/0297362 A1 | 10/2016 | Tijerina et al. |
| 2016/0370860 A1 | 12/2016 | Bychkov et al. |
| 2017/0010654 A1 | 1/2017 | Chen |
| 2017/0018234 A1 | 1/2017 | Na et al. |
| 2017/0034146 A1 | 2/2017 | Sugaya |
| 2017/0039170 A1 | 2/2017 | Tunali et al. |
| 2017/0085790 A1 | 3/2017 | Bohn |
| 2017/0090585 A1 | 3/2017 | Bernhart |
| 2017/0147879 A1 | 5/2017 | Alameh et al. |
| 2017/0201254 A1 | 7/2017 | Hanssen et al. |
| 2017/0219240 A1 | 8/2017 | Cassini et al. |
| 2017/0269725 A1 | 9/2017 | Kang |
| 2017/0321856 A1 | 11/2017 | Keates |
| 2018/0039410 A1 | 2/2018 | Kim et al. |
| 2018/0039990 A1 | 2/2018 | Lindemann |
| 2018/0136719 A1 | 5/2018 | Chen |
| 2018/0157815 A1 | 6/2018 | Salama et al. |
| 2018/0164942 A1 | 6/2018 | Huffman et al. |
| 2018/0166076 A1 | 6/2018 | Huguchi et al. |
| 2018/0188774 A1 | 7/2018 | Ent et al. |
| 2018/0189547 A1 | 7/2018 | Daniels et al. |
| 2018/0224871 A1 | 8/2018 | Sahu et al. |
| 2018/0321731 A1 | 11/2018 | Alfano et al. |
| 2018/0373292 A1 | 12/2018 | Perelli |
| 2019/0004764 A1 | 1/2019 | Son et al. |
| 2019/0034609 A1 | 1/2019 | Yang et al. |
| 2019/0079572 A1 | 3/2019 | Yamamoto |
| 2019/0129473 A1 | 5/2019 | Hu et al. |
| 2019/0147875 A1 | 5/2019 | Stemmer et al. |
| 2019/0155364 A1 | 5/2019 | Chen |
| 2019/0174419 A1 | 6/2019 | Schillings et al. |
| 2019/0236390 A1 | 8/2019 | Guo et al. |
| 2019/0239384 A1 | 8/2019 | North et al. |
| 2019/0250691 A1 | 8/2019 | Lee et al. |
| 2019/0258785 A1 | 8/2019 | Alameh et al. |
| 2019/0265831 A1 | 8/2019 | Sinnott et al. |
| 2019/0278339 A1 | 9/2019 | Cooper et al. |
| 2019/0361501 A1 | 11/2019 | Park et al. |
| 2019/0371326 A1 | 12/2019 | Booklet et al. |
| 2019/0371342 A1 | 12/2019 | Tukka et al. |
| 2020/0012331 A1 | 1/2020 | de Cesare et al. |
| 2020/0026342 A1 | 1/2020 | Sengupta et al. |
| 2020/0033920 A1 | 1/2020 | Nielsen et al. |
| 2020/0092817 A1 | 3/2020 | Bai |
| 2020/0125158 A1 | 4/2020 | Giusti et al. |
| 2020/0125179 A1 | 4/2020 | Okuley |

(56) References Cited

U.S. PATENT DOCUMENTS

| | | | |
|---|---|---|---|
| 2020/0133358 | A1 | 4/2020 | Mishra et al. |
| 2020/0134151 | A1 | 4/2020 | Magi et al. |
| 2020/0175944 | A1 | 6/2020 | Sun et al. |
| 2020/0213501 | A1 | 7/2020 | Sohn |
| 2020/0259638 | A1 | 8/2020 | Carmignani et al. |
| 2020/0348745 | A1 | 11/2020 | Hamlin et al. |
| 2021/0025976 | A1* | 1/2021 | Chandel ............ G06K 9/00335 |
| 2021/0096237 | A1 | 4/2021 | Patole et al. |
| 2021/0109585 | A1 | 4/2021 | Fleming et al. |
| 2021/0240254 | A1 | 8/2021 | Hamlin et al. |
| 2021/0318743 | A1 | 10/2021 | Partiwala et al. |
| 2022/0147142 | A1 | 5/2022 | Bui et al. |
| 2022/0334620 | A1 | 10/2022 | Cooper et al. |
| 2022/0350385 | A1 | 11/2022 | Mishra et al. |

FOREIGN PATENT DOCUMENTS

| | | | |
|---|---|---|---|
| CN | 112558056 | A | 3/2021 |
| EP | 2518586 | | 10/2012 |
| EP | 3285133 | | 2/2018 |
| JP | 10-240389 | A | 9/1998 |
| JP | 2001255854 | A | 9/2001 |
| JP | 2002071833 | A | 3/2002 |
| JP | 2005221907 | A | 8/2005 |
| KR | 102015022673 | | 2/2003 |
| KR | 20180029370 | | 3/2018 |
| KR | 20190027930 | A | 3/2019 |
| WO | 2010071631 | | 6/2010 |
| WO | 2014131188 | | 9/2014 |
| WO | 2014186294 | | 11/2014 |
| WO | 2014205227 | | 12/2014 |
| WO | 2015026203 | A1 | 2/2015 |
| WO | 2020191643 | | 10/2020 |
| WO | 2021258395 | | 12/2021 |
| WO | 2022139895 | A1 | 6/2022 |

OTHER PUBLICATIONS

International Searching Authority, "Search Report," issued in connection with International Patent Application No. PCT/CN2019/079790, dated Jan. 3, 2020, 4 pages.

European Patent Office, "Extended European Search Report," issued in connection with EuropeanPatent Application No. 20164273.3, dated Oct. 9, 2020, 14 pages.

United States Patent and Trademark Office, "Notice of Allowance," issued in connection with U.S. Appl. No. 29/673,785, dated Nov. 16, 2020, 8 pages.

European Patent Office,"Extended Search Report," issued in connection with European Patent Application No. 20181123.9, dated Dec. 4, 2020, 11 pages.

United States Patent and Trademark Office, "Non-Final Office Action" issued in connection with U.S. Appl. No. 14/866,894, dated Dec. 14, 2018, 24 pages.

United States Patent and Trademark Office, "Final Office Action" issued in connection with U.S. Appl. No. 14/866,894, dated Jul. 29, 2019, 27 pages.

United States Patent and Trademark Office, "Advisoiy Action" issued in connection with U.S. Appl. No. 14/866,894, dated Nov. 5, 2019, 6 pages.

United States Patent and Trademark Office, "Non Final Office Action" issued in connection with U.S. Appl. No. 14/866,894, dated Feb. 21, 2020, 30 pages.

United States Patent and Trademark Office, "Final Office Action" issued in connection with U.S. Appl. No. 14/866,894, dated Jun. 23, 2020, 33 pages.

United States Patent and Trademark Office, "Advisoiy Action" issued in connection with U.S. Appl. No. 14/866,894, dated Aug. 17, 2020, 9 pages.

United States Patent and Trademark Office, "Non Final Office Action" issued in connection with U.S. Appl. No. 14/866,894, dated Oct. 8, 2020, 40 pages.

European Patent Office, "Extended European Search Report" issued in connection with EuropeanPatent Application No. 201994494.9, dated Feb. 17, 2021, 62 pages.

Monica Chin, "Alexa on Windows 10 Hands-On: Useful, with 1 Big Catch", Laptop Magazine, available at https://www.laptopmag.com/articles/alexa-windows-10-hands-on (retrieved May 6, 2019), Nov. 14, 2018, 6 pages.

Notebook Review, "CES 2007: Vista SideShow in HP, Fujitsu, LG and Asus Notebooks," Notebook Review, available at www.notebookreview.com/news/ces-2007-vista-sideshow-in-hp-fujitsu-lg-and-asus-notebooks/ (retrieved May 6, 2019), Jan. 8, 2007, 8 pages.

Kul Bushan, "CES 2019: Dell's new laptop can sense your presence and wake itself," Hindustan Times, available at https://www.hindustantimes.com/tech/ces-2019-dell-latitude-7400-2-in-1-laptop-launched-price-specifications-features/story-CiRoU1GoHHsHq3K3qtPZWJ.html (retrieved May 6, 2019), Jan. 5, 2019, 8 pages.

Indiegogo, "Cosmo Communicator", available at https://www.indiegogo.com/projects/cosmo-communicator#/ (retrieved May 6, 2019), 2018, 18 pages.

Jack Purcher, "Google Patents a Motorized Pixelbook Lid that Opens and Closes with a Simple Touch & Auto-Aligns the Display to the user's Face", Patently Mobile, available at https://www.patentlymobile.eom/2017/11/google-patents-a-motorized-pixelbook-lid-that-opens-and-closes-with-a-simple-touch-auto-aligns-the-display-to-the-users-fa.html (retrieved May 6, 2019), Nov. 25, 2017, 6 pages.

NVIDIA "PDK User's Guide: Preface Personal Media Device," Manual, published Sep. 4, 2007, 39 pages.

Brian Reads, "Microsoft Windows Vista SideShow—In-Depth (pics)", Notebook Review, available at www.notebookreview.com/news/microsoft-windows-vista-sideshow-in-depth-pics/ (retrieved May 6, 2019), Jan. 11, 2006, 7 pages.

Gajitz, "Open Sesame! Gesture-Controlled Motorized Laptop Lid", available at https://gajitz.com/open-sesame-gesture-controlled-motorized-laptop-lid/ (retrieved May 6, 2019), Sep. 2012, 3 pages.

NVIDIA, "NVIDIA® Preface™ Platform Enables Windows Vista On The Go," Press Release, available at https://www.nvidia.com/object/IO_38775.html (retrieved May 6, 2019), Jan. 8, 2007, 5 pages.

NVIDIA, "NVIDIA and ASUS Deliver World's First Notebook with Windows Sideshow Secondary Display," Press Release, available at https://www.nvidia.com/object/IO_38772.html (retrieved May 6, 2019), Jan. 8, 2007, 5 pages.

Pradeep, "Dell's New Latitude 7400 2-in-1 Can Detect Your Presence and Automatically Wake the System," MSPowerUser, Jan. 4, 2019, available at https://mspoweruser.com/dells-new-latitude-7400-2-in-1-can-detect-your-presence-and-automatically-wake-the-system/ (20 pages).

Cutress, "Asus ZenBook Pro 15(11X580): A 5.5-inch Screen in the Touchpad", retrieved from https://www.anandtech.com/show/12880/asus-zenbook-pro-15-ux580-a-55inch-screen-in-the-touchpad, Jun. 5, 2018, 5 pages.

European Patent Office, "Extended European Search Report," issued in connection with European Patent Application No. 20197337.7, dated Mar. 9, 2021, 11 pages.

European Patent Office, "Rule 62a(1) Communication," issued in connection with European Patent Application No. 20197335.1, dated Mar. 17, 2021, 2 pages.

International Searching Authority, "International Search Report," issued in connection with PCT Application No. PCT/US2016/048953, dated Nov. 23, 2016.

International Searching Authority, "Written Opinion of the International Searching Authority ," issued in connection with PCT Application No. PCT/US2016/048953, dated Nov. 23, 2016, 4 pages.

United States Patent and Trademark Office, "Final Office Action," issued in connection with U.S. Appl. No. 14/866,894, dated May 11, 2021, 17 pages.

United States Patent and Trademark Office, "Non-Final Office Action," issued in connection with U.S. Appl. No. 16/586,225, dated Jun. 15, 2021, 14 pages.

(56) References Cited

OTHER PUBLICATIONS

United States Patent and Trademark Office, "Non-Final Office Action," issued in connection with U.S. Appl. No. 16/728,774, dated May 3, 2021, 12 pages.
European Patent Office, "Extended European Search Report," issued in connection with European Patent Application No. 20197335.1, dated Jul. 16, 2021, 11 pages.
International Searching Authority, "International Preliminaiy Report on Patentability," issued in connection with PCT/US2016/048953, dated Mar. 27, 2018, 10 pages.
International Searching Authority, "Search Report and Written Opinion," issued in connection with PCT Application No. PCT/CN2020/098326, dated Mar. 29, 2021, 9 pages.
United States Patent and Trademark Office, "Requirement for Restriction," issued in connection with U.S. Appl. No. 29/673,785, dated Aug. 27, 2020, 4 pages.
United States Patent and Trademark Office, "Notice of Allowance and Fee(s) Due," issued in connection with U.S. Appl. No. 14/866,894, dated Jul. 30, 2021, 8 pages.
United States Patent and Trademark Office, "Final Office Action," issued in connection with U.S. Appl. No. 16/728,774, dated Sep. 22, 2021, 20 pages.
United States Patent and Trademark Office, "Non-Final Office Action," issued in connection with U.S. Appl. No. 16/421,217, dated Oct. 27, 2021, 42 pages.
European Patent Office, "Communication pursuant to Article 94(3) EPC," issued in connection with European Patent Application No. 20164273.3, dated Sep. 28, 2021 9 pages.
United States Patent and Trademark Office, "Notice of Allowance," issued in connection with U.S. Appl. No. 16/586,225, dated Dec. 8, 2021, 6 pages.
United States Patent and Trademark Office, "Corrected Notice of Allowability," issued in connection with U.S. Appl. No. 16/586,225, dated Dec. 16, 2021, 3 pages.
International Searching Authority, "International Preliminaiy Report on Patentability," issued in connection with application No. PCT/CN2019/079790, dated on Sep. 28, 2021, 5 pages.
United States Patent and Trademark Office, "Notice of Allowance and Fee(s) Due," issued in connection with U.S. Appl. No. 16/728,774, dated Feb. 2, 2022, 9 pages.
International Searching Authority, "Invitation to Pay Additional Fees," issued in connection with PCT/US2021/049649, dated Nov. 26, 2021, 7 pages.
Intellectual Property India, "Examination Report," issued in connection with Indian Patent Application No. 202147037534, dated Feb. 2, 2023 6 pages.
Japanese Patent Office, "Notice of Reasons for Rejection," issued in connection with Japanese Patent Application No. 2021-538701, dated Feb. 21, 2023, 7 pages (English translation included).
United States Patent and Trademark Office, "Supplemental Notice of Allowability," issued in connection with U.S. Appl. No. 16/725,467, dated Mar. 1, 2023, 3 pages.
European Patent Office, "Communication pursuant to Article 71(3) EPC," issued in connection with European Patent Application No. 20164273.3, dated Dec. 23, 2022, 78 pages.
United States Patent and Trademark Office, "Final Office Action," issued in connection with U.S. Appl. No. 17/434,603, dated Feb. 8, 2023, 17 pages.
United States Patent and Trademark Office, "Notice of Allowance and Fee(s) Due," issued in connection with U.S. Appl. No. 16/725,467, dated Feb. 23, 2023, 9 pages.
United States Patent and Trademark Office, "Non-Final Office Action," issued in connection with U.S. Appl. No. 17/434,603, dated Jul. 5, 2022, 15 pages.
International Searching Authority, "International Search Report", issued in connection with PCT. Application No. PCT/US2021/049649, dated Jan. 14, 2022, 5 pages.
International Searching Authority, "Written Opinion", issued in connection with PCT. Application No. PCT/JS2021/049649, dated Jan. 14, 2022, 9 pages.
United States Patent and Trademark Office, "Final Office Action," issued in connection with U.S. Appl. No. 16/725,467, dated Aug. 18, 2022, 29 pages.
United States Patent and Trademark Office, "Corrected Notice of Allowance," issued in connection with U.S. Appl. No. 16/586,225, dated Sep. 19, 2022, 2 pages.
United States Patent and Trademark Office, "Notice of Allowance and Fee(s) Due," issued in connection with U.S. Appl. No. 16/586,225, dated Aug. 31, 2022, 2 pages.
European Patent Office, "Communication pursuant to Article 94(3) EPC," issued in connection with European Patent Application No. 20194494.9, dated Jan. 24, 2023, 6 pages.
United States Patent and Trademark Office, "Corrected Notice of Allowability" issued in connection with U.S. Appl. No. 16/586,225, dated Mar. 16, 2022, 3 pages.
Cravotta, Nicholas, "Optimizing Proximity Sensing for Consumer Electronics Applications," Digi-Key Electronics, Apr. 26, 2012, 9 pages.
Chethan, "Proximity Sensing with CapSense," Cypress AN92239, 2016, 62 pages.
United States Patent and Trademark Office, "Non-Final Office Action," issued in connection with U.S. Appl. No. 16/725,467, dated Apr. 7, 2022, 19 pages.
United States Patent and Trademark Office, "Notice of Allowance and Fee(s) Due," issued in connection with U.S. Appl. No. 16/586,225, dated Apr. 29, 2022, 6 pages.
United States Patent and Trademark Office, "Corrected Notice of Allowability," issued in connection with U.S. Appl. No. 16/586,225, dated May 18, 2022, 3 pages.
United States Patent and Trademark Office, "Notice of Allowance and Fee(s) Due," issued in connection with U.S. Appl. No. 16/421,217 dated Mar. 9, 2022, 6 pages.
European Patent Office, "Extended European Search Report," issued in connection with European Patent Application No. 19921860.3, dated Oct. 10, 2022, 8 pages.
United States Patent and Trademark Office, "Corrected Notice of Allowability," issued in connection with U.S. Appl. No. 16/586,225, dated Dec. 7, 2022, 3 pages.
United States Patent and Trademark Office, "Notice of Allowance and Fee(s) Due" issued in connection with U.S. Appl. No. 16/421,217, dated Mar. 24, 2022, 3 pages.
United States Patent and Trademark Office, "Notice of Allowance and Fee(s) Due," issued in connection with U.S. Appl. No. 17/856,587, dated Dec. 9, 2022, 9 pages.
International Searching Authority, "International Search Report," issued in connection with PCT Application No. PCT/CN2022/084726, dated Jan. 4, 2023, 4 pages.
United States Patent and Trademark Office, "Advisoiy Action," issued in connection with U.S. Appl. No. 16/725,467, dated Jan. 4, 2023, 4 pages.
International Searching Authority, "Written Opinion," issued in connection with PCT Application No. PCT/CN2022/084726, dated Jan. 4, 2023, 4 pages.
United States Patent and Trademark Office, "Non-Final Office Action," issued in connection with U.S. Appl. No. 17/129,465, dated Jan. 5, 2023, 12 pages.
European Patent Office, "Extended European Search Report," issued in connection with European Patent Application No. 23154752.2, dated May 4, 2023, 14 pages.

* cited by examiner

|  | ENGAGED | | NOT ENGAGE |
|---|---|---|---|
|  | ACTIVE ENGAGEMENT (Interacting) | PASSIVE ENGAGEMENT (Reading/Watching/ Ongoing User Task) |  |
| PRESENT | INTERACTIVE MODE<br><br>PPL: High Turbo<br>EPP: High Performance<br>P-state Cap: None<br>BAM: Strongly Limit | PRESENT BALANCED MODE<br>PPL: Normal<br>EPP: Balance<br>P-state Cap: Pe<br>BAM: Weakly Limit | PRESENT QUIET MODE<br><br>PPL: Low Power<br>EPP: Low Power<br>P-state Cap: <Pe<br>BAM: Normal Limit |
| ABSENT | N/A | ABSENT BALANCED MODE<br>PPL: Normal<br>EPP: Balance<br>P-state Cap: Pe<br>BAM: Normal Limit | ABSENT QUIET MODE<br><br>PPL: Low Power<br>EPP: Low Power<br>P-state Cap: Pe<br>BAM: Normal Limit |
|  |  | FAN CONTROL MODE ACTIVE | |

NOTES
- PPL: Package Power Limit
- EPP: HWP Energy Performance Preference (bias)
- P-state Cap: Maximum P-state allowed, where Pe or lower will disable Turbo
- BAM: Background Activity Manager, where Strongly Limit = aggressively throttle

FIG. 2

METHODS AND APPARATUS TO MANAGE POWER AND PERFORMANCE OF COMPUTING DEVICES BASED ON USER PRESENCE

RELATED APPLICATIONS

This patent arises from a non-provisional patent application that claims priority to U.S. Provisional Patent Application No. 62/933,944, which was filed on Nov. 11, 2019, and which is hereby incorporated herein by reference in its entirety.

FIELD OF THE DISCLOSURE

This disclosure relates generally to computing devices, and, more particularly, to methods and apparatus to manage power and performance of computing devices based on user presence.

BACKGROUND

There is often a tradeoff between achieving power efficiencies and performance efficiencies in computing devices. That is, reducing power consumption of a computing device can save power (e.g., to extend battery life), but may come at some cost to the performance and/or responsiveness of the device, thereby deleteriously impacting user experience. On the other hand, computational efficiency and/or performance of a computing system can often be improved to enhance user experience to some extent by increasing power consumption, but this reduces power efficiencies.

BRIEF DESCRIPTION OF THE DRAWINGS

FIG. 2 is a table defining settings for different performance parameters associated with different operation modes for the computing device of FIG. 1 based on the presence and/or engagement of a user.

Figure 1:
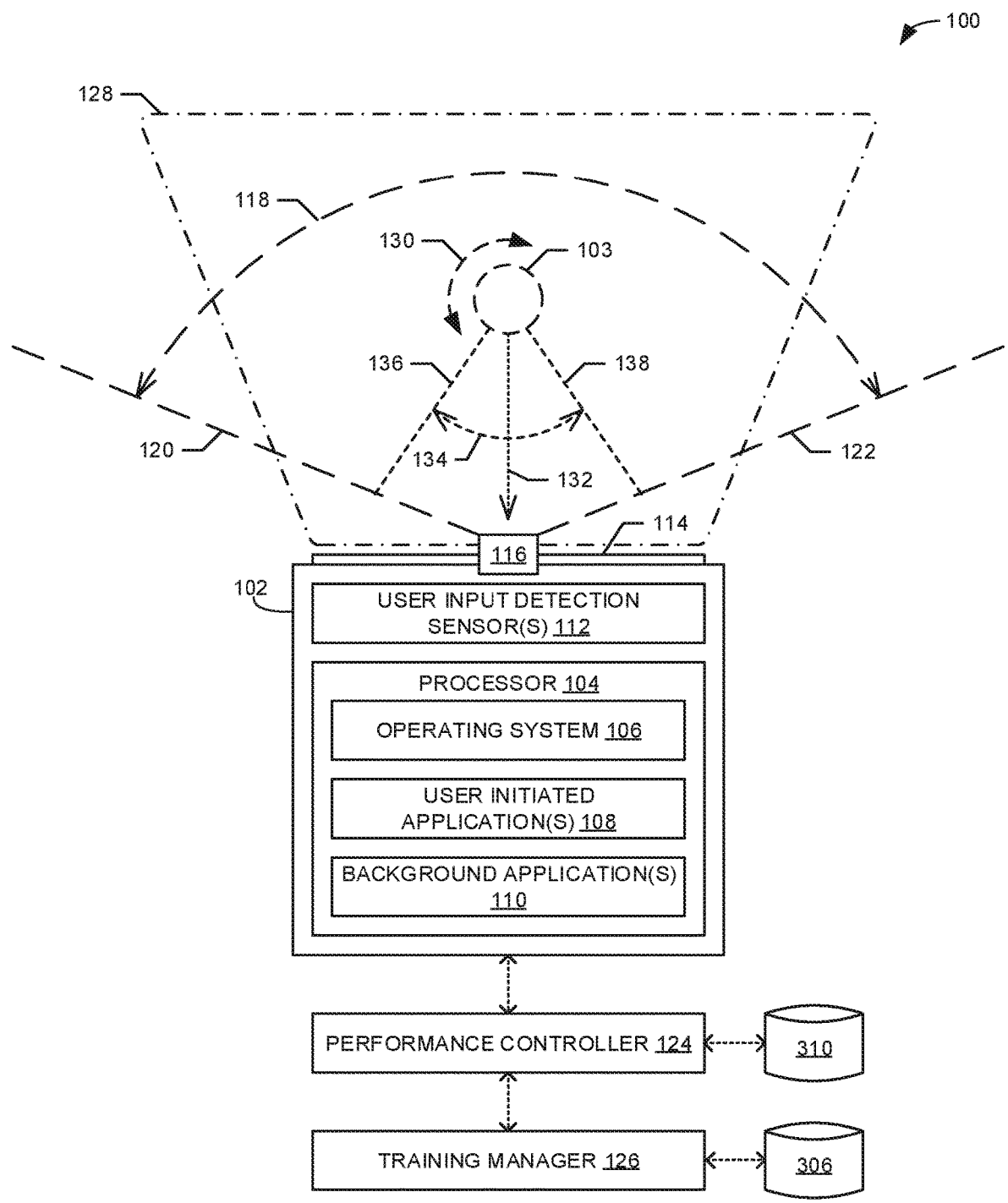
FIG. 1 illustrates an example system constructed in accordance with teachings disclosed herein for managing the power and/or performance of an example computing device.

The figures are not to scale. In general, the same reference numbers will be used throughout the drawing(s) and accompanying written description to refer to the same or like parts. As used in this patent, connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Energy efficiency has long been an important factor in designing computing devices to increase battery life. More recently, as awareness of the environmental concerns have increased, energy efficiency has also become an important consideration for AC-powered computing devices. Some computing devices may operate in either an AC-powered mode (e.g., when plugged into a wall socket) or a DC-powered mode (e.g., when powered by a battery). As used herein, a computing device refers to any type of device (e.g., a laptop, a desktop computer, a tablet, a smartphone, etc.) that may be AC-powered, DC-powered, and/or selectively powered by either AC or DC sources. Regardless of whether a computing device is plugged into a wall socket (AC-powered) or running on a battery (DC-powered), increasing energy efficiency often involves sacrificing the performance efficiency (e.g., computational speed and/or operational responsiveness) of the device. Thus, while implementing operations with less power may reduce power consumption and/or increase battery life, such endeavors may reduce a user's experience.

Many existing computing devices switch between different power modes depending on whether the device is running on AC power or DC power. That is, many computing devices are implemented to prioritize energy efficiency over performance efficiency (e.g., optimize for lower power) when running on DC power and to prioritize performance efficiency over energy efficiency (e.g., optimize for performance) when running on AC power. Such changes in the power consumption and performance of a computing device can result in an inconsistent user experience depending on whether the device is AC powered or DC powered. However, basing the performance of a computing device (and the corresponding power consumption and/or user experience) on whether the device is powered by AC or DC may result in a waste of energy in some circumstances (e.g., due to operating in a higher performance mode than necessary) and less than desirable performance in other circumstances (e.g., due to operating in a lower power mode than desirable for the current operations for which the device is being used). For instance, even though a device may be running on AC power, if there is no user present and/or the user is not actively interested in the operation of the device, there is no need to prioritize performance efficiency over energy efficiency because a reduced performance (based on a lower power mode) does not affect user experience inasmuch as the user is not present or engaged sufficiently to experience the reduced performance. On the other hand, when a user is actively engaged in the operation of a computing device, the user may desire high performance for a better user experience even when the device is running on DC power.

Another problem with basing the management of power and performance on whether a computing device is AC powered or DC powered is that power inefficiencies associated with a high performance mode when AC powered can actually result in a loss of performance. For instance, to increase performance when running on AC power, the power management on certain components of a computing device (e.g., a Wi-Fi component) is often disabled to reduce (e.g., minimize) latency. However, disabling power management for a Wi-Fi component has been found to increase power consumption of some devices by approximately 350 mW without any meaningful performance gain. Consuming 350 mW of power without any appreciable benefit leaves that much less power in the power budget of a computing device to accomplish other tasks, thereby resulting in a reduction in performance relative to when the power management for the Wi-Fi component remains enabled. Such inefficiencies negatively impacting the power budget for a device can be particularly significant for thermally constrained form factors and platforms that support per core performance states.

Information technology (IT) management software and the like is another factor that can affect the power and performance (and corresponding user experience) of computing devices. For instance, many types of IT software services are scheduled to run every day and/or on some other relatively regular basis. While such operations may run in the background so they are not visible to an end user, they may nevertheless negatively impact user experience because the IT operations increase the system load, thereby using clock cycles that could otherwise be devoted to other tasks. Of course, as outlined above, such an impact on the performance of a computing device is an issue that affects the experience of end users only when the users are, in fact, present and engaged in the operation of the device. If a user is not present or otherwise not engaged with the computing device, a reduction in performance and/or responsiveness caused by the running of IT software in the background is less of a concern. However, even when a user is not present and/or not engaged with a computing device, IT software may reduce battery life if the software is executed while the device is running on DC power. Furthermore, not only can the execution of IT software increase the system load to reduce the performance and/or responsiveness of a computing device as perceived by an end user, the increases in system load may result in the device operating in a higher power mode that turns into excess heat. Such excess heat may cause a fan in the device to turn on and/or increase speed in a manner that is audibly noticeable and/or otherwise distracting to the end user.

One solution to improve (e.g., optimize) the balance between the competing interests of power efficiency and performance efficiency for enhanced user experience and longer battery life involves tuning the operation of a computing device using dynamic energy performance preference (EPP) techniques based on data transfers (e.g., file I/O) from memory. Dynamic EPP enables the dynamic selection and/or tuning of operating frequencies and/or voltages for different components of a computing device affected by particular tasks to be performed as indicated by the file I/O. Powering particular components of a computing device to the extent needed and when needed in a dynamic manner using EPP enables an improved (e.g., optimized) balance between power consumption and performance, thereby giving rise to an improved user experience. However, EPP can have a negative impact on battery life without a corresponding improvement to user experience because of a relatively high rate of false positives corresponding to many types of file I/Os that are not related to user critical tasks. Furthermore, EPP is not always able to distinguish between tasks that benefit the user (e.g., foreground tasks in which the user is engaged and/or otherwise able to perceive) and tasks that occur in the background and/or are of no immediate interest to the user. Further still, EPP is insufficient to take advantage of all potential power saving and/or performance improvements because EPP does not address scenarios that involve operations associated with relatively few or no file IO operations.

Machine learning based dynamic platform and thermal framework (DPTF) is another approach to improving tradeoffs between power savings and performance. DPTF is a framework developed by Intel® that manages power provided to a processor while maintaining the temperature of the system within suitable limits. More particularly, DPTF involves the use of machine learning to predict the performance requirements of a system to adjust fan speed and power (and corresponding performance) in anticipation of particular use cases such as where a burst of relatively high performance is needed (associated with an increase in power) and/or where computational loads are relatively low (associated with the need for relatively low levels of power). While DPTF is promising to improve the balance between power efficiency and performance efficiency in some situations, the approach is relatively complex and based on machine learning models that need to be trained for a wide range of users and/or use cases. Implementing such complex models can significantly increase power consumption and, therefore, are typically not implemented on battery powered devices but reserved for devices running on AC power.

Some computing devices implement a background activity manager (e.g., the background activity moderator (BAM) developed by Microsoft® for the Windows® operating systems) that controls the activity of background applications to reduce an impact of such activity on user experience associated with the implementation of user-initiated tasks. More specifically, such background activity managers monitor background tasks and suppress the implementation of such tasks to particular periods of time and/or at reduced frequencies less likely to impact operations of particular interest to an end user. While reducing the frequency of background tasks reduce the frequency at which such tasks impact user experience, the background tasks are still performed and, therefore, still impact user experience if the tasks coincide with user-initiated tasks. Furthermore, background activity managers are not always able to detect activity that is purely in the background (e.g., that has no effect on the experience or perception of an end user) and, therefore, may adversely impact user experience in certain use cases where users are interested in the operation of multiple tasks at the same time. As a specific example, a user may be engaged in a video conference call using a first application on a computing device while concurrently checking emails using a second application. With the email application being the application in which the user is actively engaged, a background activity manager may incorrectly determine the ongoing video conference call as a background application that the user is not interested in and, thus, adversely impact the user experience with the conference call by suppressing and/or reducing operations associated therewith.

In contrast with existing computing devices that switch between different operational modes based on the source of power (whether AC or DC), example computing devices disclosed herein manage power and performance based on user presence and/or engagement with the operation of the example devices to provide for a more consistent user experience when a user is present and/or engaged with the device and to conserve power (e.g., to save battery life) by operating in lower power modes when a user is not present and/or not engaged with the device. Furthermore, in some examples, detection of user presence and/or engagement is used in conjunction with dynamic EPP to significantly reduce the false positives that occur to reduce when EPP is implemented based on file I/O without the benefit of the context of user activity and the associated tasks of particular interest to the user made possible by the detection of user presence and/or engagement. Further still, the context of device usage made possible by the detection of user presence and/or engagement can significantly reduce the challenges relating to complexity and power consumption presented by machine learning DPTF. That is, in some examples, detection of user presence and/or engagement can provide context to facilitate machine learning models associated with DPTF to identify relevant circumstances by which future power needs may be more easily predicted to appropriately manage power and fan speed with relatively little computational burden. This reduced computational burden may correspond to a reduced power consumption, thereby making DPTF a viable option regardless of whether an associated device is powered by AC or DC sources. In some examples, the detection of user presence and/or engagement is used in conjunction with a background activity manager to provide suitable context to properly identify what tasks are of particular interest to a user to ensure they are given priority and not mistakenly treated as a background task. Further, the detection of user presence and/or engagement can enable a background activity manager to identify suitable times to increase or decrease background activity that is based on the context of actual user activity rather than an assumed schedule for the background activity. As a result, relevant background activity can be completed at times when a user is not present and/or not engaged with the operations of the computer and reduce background activity when the user is present and/or engaged so as not to affect user experience any more than necessary, if at all.

As described more fully below, in some examples, multiple different operational modes may be defined for a computing device that give different degrees of preference to performance efficiencies on the one hand and power efficiencies on the other hand. In some examples, switching between the different operational modes is determined based on (1) whether or not a user is present, and (2) whether or not the user is engaged with the operation of the computing device.

As used herein, a user is determined to be "present" when the user is identified in an image captured by an image sensor of the computing device. In some examples, a user identified within image data may not be considered present if the user is more than a threshold distance away from the computing device based on the user being smaller than a threshold size within the image.

As used herein, a user is determined to be "engaged" or exhibiting "engagement" with a computing device when the user provides an indication of interest in the operation of the computing device. In some examples, a user indicates interest with the operation of the computer device (e.g., is engaged with the device) by interacting with a human-machine interface (also known as a human interface device (HID)) associated with the computing device (e.g., interacting with a keyboard, a mouse, a touchscreen, etc.). Such interactions with a computing device are referred to herein as active engagement with the computing device. Additionally or alternatively, in some examples, a user is determined to be engaged (e.g., indicates interest in the operation of the computing device) based on a determination of the user's gaze from an analysis of the image captured by the image sensor. For instance, if a user is looking at the computing device, user engagement is inferred. By contrast, if a user is looking away from the computing device, a user is determined to not be engaged. A user determined to be looking at the computing device without actively interacting with the device is referred to herein as being passively engaged with the computing device.

There are other forms of passive engagement with a computing device that do not depend on the user looking at the device. For instance, a user may initiate the downloading of a large file, the compiling of computer code, the processing of a large date file, transcoding a video, etc., and then look away while the task is completed. In such situations, while the task may have involved active engagement to initiate, during the ongoing completion of the task, the user may no longer be actively interacting with the device (via a human machine interface) or even looking at the device. However, the user has still indicated an ongoing interest in the operation of the device based on the ongoing task that was initiated by the user. Accordingly, such user-initiated tasks are referred to herein as a form of passive engagement with the computing device. In some instances, a user may leave the presence of a computing device while a user-initiated task is ongoing. Thus, it is possible for a user to be engaged (e.g., passively engaged) with a computing device even though the user is not present.

In some examples, the different operation modes correspond to different power levels and different performance levels. As used herein, "performance level" refers to the performance efficiency at which a computing device operates. Thus, a higher performance level corresponds to greater performance efficiency and, therefore, an improved user experience. As used herein, "power level" refers to the amount of power consumed by a computing device. Thus, a higher power level corresponds to great power consumption (e.g., less power efficiency). As mentioned above, performance and power consumption are often related such that a higher performance level corresponds to a higher power level and vice versa. In some examples, the different operation modes of the computing device may include one or more of (1) an interactive mode corresponding to when a user is present and actively engaged with the computing device, (2) a present balanced mode corresponding to when a user is present and passively engaged with the computing device, (3) an absent balanced mode corresponding to when a user is not present (e.g., is absent) but is passively engaged with the computing device, (4) a present quiet mode when the user is present but not engaged with the computing device, and (5) an absent quiet mode when the user is not present and not engaged with the computing device. In some examples, the present balanced mode and the absent balanced mode may be combined into a single balanced mode corresponding to when the user is passively engaged with the computing device regardless of whether the user is present or not. Similarly, in some examples, the present quiet mode and the absent quiet mode may be combined into a single quiet mode corresponding to when the user is not engaged with the computing device regardless of whether the user is present or not.

As described more fully below, the interactive mode is associated with a higher performance level and a higher power level than the other operation modes to enhance (e.g., optimize) the performance of the computing device for an improved user experience. A quality user experience in the interactive mode is important because it corresponds to circumstances when the user is actively interacting (e.g., actively engaged) with the computing device and, therefore, likely to be the most interested in fast responses with the device operating at peak performance. The balanced modes are associated with power levels and performance levels that are relatively balanced between performance efficiency and power efficiency. In this manner, a user is still able to have a quality user experience while at the same time conserving energy (e.g., to extend battery life). Reducing the performance efficiency of the device during the balanced mode relative to during the interactive mode is appropriate in this circumstance because the user is not actively interacting with the device such that all user-initiated tasks are already specified such that there is less need to be ready to respond to additional computational loads from additional user inputs. The quiet modes are associated with lower performance levels and lower power levels than the other operation modes to reduce (e.g., minimize) the power consumption of the computing device for improved power efficiency (e.g., extended battery life). Power consumption may be treated as a priority in the quiet mode because a reduction in user experience is not a concern inasmuch as the user is not engaged in the operation of the computing device.

As mentioned above, in some examples, the determination of the particular operation mode to implement at any given point in time is based on an analysis of image data captured by an image sensor of the computing device. In some examples disclosed herein, at least some of the image data analysis to determine the presence and engagement (based on gaze direction) of a user is performed by one or more processors that are in communication with the image sensor and that operate in a low power mode or an ultra-low power mode (e.g., consuming around 10 mW). In such examples, the processor(s) (e.g., digital signal processor(s)) generate metadata indicating whether the user is present (e.g., represented by "1") or absent (e.g., represented by "0") based on the facial recognition analysis of the image data. The metadata indicating user presence or absence is used to manage the power and performance of the computing device, thereby reducing power costs associated with transmitting, processing, and/or analyzing image data.

In some examples, the gaze analysis is not performed until the user is determined to be within a particular proximity range of the computing device so as not to expend resources when the user is at a distance in which the user may be considered to be absent from the device (e.g., where the user is unlikely to be able to easily view content on a display screen of the device based on the distance of the user). In some situations, if the user is providing inputs at the device (e.g., is actively engaged with the device), examples disclosed herein refrain from analyzing the image data with respect to user presence and/or gaze. That is, in some examples, active interaction with the computing device is used to infer user presence and engagement.

FIG. 1 illustrates an example system 100 constructed in accordance with teachings disclosed herein for managing the power and/or performance of a computing device 102 based on the detection of the presence and/or engagement of a user 103 with the device 102. The computing device 102 can include a personal computer, a laptop, a tablet, a smart phone, etc. In the example of FIG. 1, the computing device 102 includes at least one processor 104. The example processor 104 may correspond to any type of processing unit, such as a processor core, a processor and/or a microcontroller. In some examples, the processor 104 is associated with a system-on-a chip (SoC). The example processor 104 may execute, among other things, an operating system 106 and various other software applications including user-initiated application(s) 108 and background application(s) 110.

An example operating system 106 is an operating system from Microsoft® corporation such as Windows® 10, Windows® 8, etc. An example user-initiated application is an application through which the user 103 interacts with the computing device 102 to accomplish user-initiated and/or user-specified tasks (e.g., a word processing application, a web browser, a video player, etc.). Users 103 may interact with the computing device 102 via one or more peripherals such as a keyboard, a mouse, a touchscreen, a microphone, etc. that are in communication with example user input detection sensor(s) 112 of the computing device 102. The user input detection sensor(s) 112 transmit data indicative of user activity or inactivity to the processor 104. Further, many user-initiated application(s) 108 include associated user interfaces rendered via a display screen 114 of the computing device 102 to facilitate the user interactions (e.g., to display requested content (e.g., documents, webpages, videos, etc.), visually confirm receipt of user input data, indicate options for user selection, etc.). The example background application(s) 110 include applications that do not involve ongoing interactions with a user 103. While some background applications 110 may be initiated by a user interaction, other background applications 110 may be initiated independent of the user 103 (e.g., by the operating system 106, an IT administrator, an IT security software application managed by an IT administrator, etc.). Some background applications 110 may include associated user interfaces rendered via the display screen 114. However, other background applications 110 may not provide any indication to the user 103 (visual or otherwise) that such applications are operating. In some examples, the operating system 106 includes a background activity manager (e.g., the background activity moderator (BAM) for the Windows® operating system) to manage the initiation and/or ongoing operation of the background applications 110.

Implementation of any one of the operating system 106, the user-initiated application(s) 108, and the background application(s) 110 contribute to the computational load on the processor 104, which contributes to the power consumed by the computing device 102. Furthermore, implementation of any one of the operating system 106, the user-initiated application(s) 108, and/or the background application(s) 110 may also involve the operation of other components (e.g., memory, network cards, display drivers, other communication interfaces, cooling fans, etc.) in the computing device 102 that also contribute to the amount of power consumed by the device 102. High power demands by components and/or operations of the computing device 102 result in an increase in power consumption and a corresponding decrease in battery life (assuming the device is battery powered) and/or a reduction in energy efficiency. Thus, reducing power consumption is an important consideration in designing and operating computing devices. However, a reduction in power consumption can negatively impact the performance of the computing device 102, which may negatively impact user experience. A reduction in performance efficiency may not necessarily negatively impact user experience if the reduction in performance is not noticed by a user. Accordingly, in some examples, to reduce power consumption without significantly impacting user experience, operations of the computing device 102 may be switched between higher and lower power operation modes depending on the activity and/or engagement of the user 103 with the operations of the device.

For instance, based on data generated by the user input detection sensor(s) 112, the processor 104 may cause the display screen 114 to turn off after a predefined period of time with no user input (e.g., 10 minutes, 15 minutes). Additionally or alternatively, in some examples, after a predefined period of time without user activity, the processor 104 may cause the computing device 102 to enter a sleep mode, or a mode in which the computing device 102 is in a low power state.

Although the processor 104 may cause the computing device 102 to enter a sleep mode and the display screen 114 to turn off based on predefined periods of user inactivity, such predefined periods may not accurately reflect the activity of the user 103 with respect to the computing device 102. For instance, there may be periods of time in which the user 103 is not looking at the display screen 114 or is not present relative to the computing device 102 that are shorter than the predefined timeout periods that trigger the processor 104 to turn off the display screen 114. For example, during operation of the computing device 102, users 103 may avert their gaze from the display screen 114 to, for instance, review paper documents, talk to another person who has entered the room, etc. In some examples, users 103 may walk away from the computing device 102 and then return to the computing device 102. Thus, there are periods of time in which the user 103 may not be attentive to the display screen 114 or in the presence of the computing device 102 that are not accurately captured by predefined timeout periods of user inactivity. However, during these periods of time in which the user 103 is not paying attention to the display screen 114 (by being absent or not engaged), there is little concern that the user 103 would perceive a reduction in performance of the computing device 102. Therefore, these periods of user absence and/or disengagement with the computing device 102 present opportunities to reduce power consumption based on a reduction in performance efficiency without negatively impacting user experience.

The example computing device 102 of FIG. 1 includes one or more image sensors 116. The example image sensor 116 provides means for generating image data. In the illustrated example of FIG. 1, the image sensor 116 includes a user-facing camera (e.g., the camera facing in the same direction as the display screen 114). The example image sensor 116 may be coupled to the display screen 114, disposed in a bezel surrounding the display screen 114, and/or located on other portions of the computing device 102 (e.g., a base of a laptop). The image sensor 116 of the example of FIG. 1 is associated with an imaging field of view (FoV) 118 represented as spanning between the dashed lines 120, 122 in FIG. 1. The imaging FoV 118 can correspond to, for instance, a field of view of the front-facing camera or image sensor 116 of the computing device 102. In the example of FIG. 1, the image sensor 116 generates image data representing objects present within the imaging FoV 118 corresponding to the area surrounding the computing device 102.

The user 103 may move in and out of the imaging FoV 118 while the computing device 102 is in a powered-on state. For example, the user 103 may be within the imaging FoV 118 when working at a desk on which the computing device 102 rests. The user 103 may move out of the imaging FoV 118 when the user 103 walks away from the computing device 102 to, for instance, go to lunch. In some examples, when the user 103 is within the imaging FoV 118, the image sensor 116 generates image data that includes the user 103. In some such examples, the distance of the user 103 from the device 102 may be indicated by the size of the user 103 represented in the image data relative to the rest of the FoV 118 (e.g., the user will appear larger when closer to the device 102 and smaller when farther away). In some examples, image data generated when the user 103 is outside of the imaging FoV 118 will not include the user 103.

In the example of FIG. 1, the image sensor 116 generates image data when the computing device 102 is in a powered-on state, including when the computing device 102 is in a sleep mode (e.g., a low power mode). Put another way, the image sensor 116 operates in an always-on mode. To conserve power while providing for always-on sensing, the example image sensor 116 of FIG. 1 operates in a low power mode. For example, the image sensor 116 can capture image data at a low resolution and/or at a low frame rate when operating in the low power always-on mode to conserve power (e.g., based on instructions from the processor 104 of the computing device). When the image sensor 116 is generating image data during use of the device by the user in connection with, for instance, a video conferencing application, the example image sensor 116 can switch to generating high-resolution image data at a high frame rate (e.g., based on instructions from the processor 104 of the computing device). The example image sensor 116 can return to operating in the always-on, low power mode after operation of the video-conferencing application has ended. Thus, in some examples, the example of FIG. 1 further conserves energy by using existing means for generating image data such as the user-facing camera of the computing device 102 to capture image data for determining user presence. In some examples, the image sensor 116 can generate image data at a rate of, for instance, 10 frames/second while operating in the always-on, low power mode.

In the example system 100 of FIG. 1, the image data generated by the image sensor 116 is processed by a performance controller 124. The example performance controller 124 of FIG. 1 provides means for adjusting and/or controlling the power level and/or performance level of the computing device 102 based on user presence and/or engagement with the operation of the device. The example performance controller 124 can be implemented by one or more processors of the computing device 102, such as the processor 104 of FIG. 1. In some examples, at least some of the analysis performed by the performance controller 124 is implemented by processor(s) of the computing device 102 operating in a low power mode or ultra-low power mode, such as digital signal processor(s). In other examples, the performance controller 124 is implemented by one or more cloud-based devices, such as one or more servers, processors, and/or virtual machines located remotely from the computing device 102. In other examples, some of the analysis performed by the performance controller 124 is implemented by cloud-based devices and other parts of the analysis are implemented by local processor(s) or one or more computing device(s).

In some examples, the performance controller 124 receives the image data in substantially real-time (e.g., near the time the data is collected). In other examples, the performance controller 124 receives the image data at a later time (e.g., periodically and/or aperiodically) based on one or more settings but sometime after the image data was generated (e.g., seconds later, minutes later). In some examples, the performance controller 124 performs one or more operations on the image data such as filtering the raw image data and/or removing noise from the image data.

In the illustrated example of FIG. 1, the performance controller 124 of FIG. 1 serves to process the image data generated by the image sensor 116 to determine whether the user 103 is present within the imaging FoV 118 and/or whether the user is engaged with the operation of the computing device 102. More particularly, in some examples, the performance controller 124 executes one or more learned models to determine the presence of the user 103 within the imaging FoV 118 and the engagement of the user 103 in the operations of the computing device 102 based on the image data generated by the image sensor 116. The example performance controller 124 of FIG. 1 is trained by a training manager 126 using machine learning technique(s) (e.g., supervised learning) and training image data including the user 103 and/or other users to detect human face(s) and/or to recognize particular human facial feature(s) such as a nose, an ear, a mouth, etc. Using the learned face detection model(s), the example performance controller 124 analyzes the image data generated by the image sensor 116 and determines whether the user 103 is present within the imaging FoV 118. Based on the detection of the user 103 in the imaging FoV 118 and one or more predefined rules, the performance controller 124 controls settings for particular performance parameters affecting the power level and/or performance level of the computing device 102.

When the example performance controller 124 of FIG. 1 determines that the user is within a viewing area 128 of the display screen 114, the performance controller 124 analyzes the image data using the learned face detection model(s) to identify a direction of a gaze 132 of the user 103 relative to the image sensor 116. In some examples, the gaze direction 132 of the user 103 corresponds to a direction extending directly in front of the user's face. Thus, in some examples, the direction of gaze 132 of the user 103 is defined as an angle of the user's face relative to the image sensor 116. In the example of FIG. 1, the direction of the user's gaze relative to the image sensor 116 serves as an indicator of the user's gaze relative to the display screen 114 and, thus, the attentiveness of the user 103 to the display screen 114. That is, if the user 103 is facing towards the display screen 114, the example performance controller 124 may infer that the user 103 is interested in the content rendered on the display screen 114 and, therefore, is engaged in the operation of the computing device 102. On the other hand, if the user 103 is facing off to the side or away from the display screen 114, the example performance controller 124 may infer that the user 103 is not interested (e.g., engaged) in the operation of the computing device 102. For instance, the user 103 may be sitting at his or her desk within the viewing area 128 of the display 114, but turned away from the display screen 114 while talking to a colleague, reading a paper document, etc. Turning of the user 103 relative to the device 102 is represented by the curved arrow 130 of FIG. 1. In some examples, the performance controller adjusts the performance of the computing device 102 based on the inferred engagement of the user 103 to either increase performance for improved user experience (e.g., when the user is engaged) or decrease performance to conserve power (e.g., when the user is not engaged).

In some examples, the performance controller 124 determines gaze direction 132 based on identification of an orientation of a head of the user 103 and/or on identification of facial features in the image data, including whether, for example, one ear is visible, two eyes are visible, etc. People do not always look directly in front of themselves but may rotate their eyes in any direction. Accordingly, in some examples, when the user 103 is in the viewing area 128 of the display 114, the example performance controller 124 of FIG. 1 determines a user field of view FoV 134 surrounding the central gaze direction 132 of the user. In the example of FIG. 1, the user FoV 134 is represented as spanning between the dashed lines 136, 138. In the example of FIG. 1, the performance controller 124 is trained by the training manager 126 using machine learning algorithm(s) to recognize facial features and to determine a direction of gaze 132 and/or a user FoV 134 based on the recognition of such facial features. Based on the determination of the gaze direction 132 and/or the user FoV 134 and one or more predefined rules, the example performance controller 124 controls settings for particular performance parameters affecting the power level and/or performance level of the computing device 102.

In some examples, the training manager 126 is implemented by the processor 104 of the computing device 102. In some examples, the training manager 126 is implemented by a different processor of the computing device 102. In other examples, the training manager 126 is implemented by one or more cloud-based devices, such as one or more servers, processors, and/or virtual machines. In other examples, some of the analysis performed by the training manager 126 is implemented by cloud-based devices and other parts of the analysis are implemented by processor(s) or one or more computing device(s). The processor(s) and/or cloud-based device(s) that are used to implement the example training manager 126 can be the same as or different than the processor(s) and/or cloud-based device(s) used to implement the performance controller 124.

In some examples, the performance controller 124 further reduces power consumption by the computing device 102 based on data from the user input detection sensor(s) 112 indicating that the user 103 is actively engaged with the computing device 102 (e.g., typing on a keyboard). In such examples, the performance controller 124 saves power costs by instructing the image sensor 116 not to generate image data and/or by refraining from analyzing image data with respect to the user's presence and/or gaze direction, as the user inputs indicate that the user is currently present and attentive to the computing device 102.

In some examples, the performance controller 124 of FIG. 1 controls one or more performance parameters governing the power consumption, performance, and/or system responsiveness of the computing device 102 in response to a determination of the presence and/or engagement of the user 103 with the operation of the computing device 102. For instance, the example performance controller 124 may adjust or tune a power limit (PL) parameter that defines a package power limit for the processor 104 and/or the associated SoC containing the processor 104 based on whether or not the user 103 is determined to be present and/or engaged with the computing device 102. As used herein, the package power limit defines the limit on the power draw (and corresponding performance) of the processor 104 and/or associated SoC. A higher package power limit enables the processor 104 to operate at higher frequencies for longer periods. However, higher package power limits result in greater power consumption.

Additionally or alternatively, in some examples, the performance controller 124 may adjust an energy performance preference (EPP) parameter to define how the operating frequencies and/or voltages of components of the computing device 102 are to be dynamically selected and/or tuned in response to relevant file I/O. More particularly, the EPP parameter defines whether (1) preference is given to performance efficiency (e.g., higher performance and corresponding higher power consumption), (2) preference is given to power efficiency (e.g., lower power at the cost of some level of performance), or (3) performance efficiency and power efficiency are to be relatively balanced. In some examples, the EPP parameter may represent a sliding scale between performance and power preferences, thereby indicating the degree of priority or preference given to one factor over the other. Unlike traditional dynamic EPP that is based on file I/O without the context of the user presence and/or engagement, the performance controller 124 of the illustrated example assigns the EPP parameter based on whether the image data from the image sensor 116 indicates the user is present or absent and whether the user is engaged or not engaged with the operation of the computing device 102. This can significantly reduce the dynamic EPP false positives in which power consumption is unnecessarily increased for file I/O events not associated with tasks of particular interest to the user 103.

Additionally or alternatively, in some examples, the performance controller 124 may define a P-state cap that defines a highest performance state (P-state) at which the processor 104 may operate (e.g., the processor 104 is prevented from operating at higher P-states than the P-state cap). The example processor 104 may be configured to operate at any one of a plurality of P-states associated with different operating frequencies and corresponding voltages. As used herein, a first P-state is "higher" than a second P-state when the first P-state corresponds to a higher performance associated with a higher operating frequency (and corresponding higher voltage). Thus, in some examples, the highest P-state (e.g., P0) corresponds to a turbo frequency with lower P-states (e.g., P1, P2, PN) corresponding to lower frequencies (and lower power consumption).

Additionally or alternatively, in some examples, the performance controller 124 may adjust a background activity manager (BAM) parameter to control the degree to which a background activity manager limits or throttles background activity. Unlike existing background activity managers that control background activity based on schedules assumed to reduce any impact on user experience, the example performance controller 124 of the illustrated example assigns the BAM parameter based on whether the image data from the image sensor 116 indicates the user is present or absent and whether the user is engaged or not engaged with the operation of the computing device 102. Therefore, background activity may be controlled based on actual behavior and/or activity of the user in disclosed examples to reduce the impact on the performance and/or responsiveness of the computing device 102 when a user 103 is present and/or engaged with the device while enabling and/or increasing background activity when the user is absent and/or not engaged.

The PL parameter, the EPP parameter, the P-state cap, and the BAM parameter are collectively referred to herein as performance parameters. In some examples, different values for one or more of the different performance parameters set and/or adjusted by the performance controller 124 may be collectively defined in connection with different operation modes for the computing device 102. In some such examples, the particular operation mode selected for implementation at any given point in time is based on the user presence and/or engagement determined from an analysis of the image data generated by the image sensor 116. Example operation modes and the associated settings for the different performance parameters are outlined in the table shown in FIG. 2.

As shown in the illustrated example of FIG. 2, when a user 103 is present and actively engaged, the performance controller 124 may select a, interactive mode 202 to define the operation of the computing device 102. As described above, active engagement is identified based on data obtained from the user input detection sensor(s) 112 indicating the user 103 is interacting with the computing device 102. In some examples, a user 103 is assumed to be present when the user is interacting with the computing device 102. For this reason, no operation mode is represented in FIG. 2 for the scenario where a user is actively engaged but absent from the computing device 102. Notably, there are scenarios of where a user may be determined to be absent but nevertheless still be actively engaged in the operation of the computing device 102. For example, the user 103 may be actively interacting with the computing device 102 through a remote connection or the user may be present and interacting with the device but indicated as being absent because the user is positioned outside of the imaging FoV 118 (e.g., interacting via voice commands from behind the device 102). In such scenarios the user is nevertheless treated as being present (e.g., user presence is inferred from the user interactions with the device) to select the interactive mode 202 because the user interactions indicate the user is likely interested in a high performing responsive system regardless of the actual location of the user.

As shown in the illustrated example, the interactive mode 202 defines a package power limit set to "High Turbo" corresponding to the highest package power limit available for the processor 104. Further, the EPP parameter for the interactive mode 202 is defined to give preference to high performance (at the expense of power savings). Further, in this example, the interactive mode 202 does not specify a P-state cap. That is, the example computing device 102 is not limited in the P-states in which the device may operate but is able to operate in any P-state up to the highest P-state (e.g., highest frequency of operation) designed for the device. Finally, as shown in the example of FIG. 2, the interactive mode 202 strongly limits (e.g., aggressively throttles) background activity, thereby reserving processor capacity for tasks of particular interest to the user (e.g., user-initiated tasks and/or tasks associated with the ongoing interactions of the user 103 with the device 102). In this example, the interactive mode 202 is the highest performing operation mode (relative to the other operation modes) to increase (e.g., maximize) user experience inasmuch as the user is present and actively engaged in the operation of the computing device 102. As such, the interactive mode 202 is also associated with the highest power consumption. While the high power consumption during the interactive mode 202 negatively impacts battery life, this is an acceptable trade off because the power consumption is specifically tied to circumstances in which a user is most likely interested in high performance and system responsiveness. Furthermore, the increases in power consumption during the interactive mode 202 may be more than offset by switching to other lower power operation modes when the user 103 is absent or less engaged (e.g., passively engaged or not engaged) with the operation of the computing device 102.

For instance, as represented in FIG. 2, when a user 103 is present but only passively engaged, the example performance controller 124 may select a present balanced mode 204 to define the operation of the computing device 102. As described above, passive engagement may be identified in one of two ways. In some instances, passive engagement may be inferred from an analysis of the image data generated by the example image sensor 116 indicating that a present user is looking at (e.g., reading or watching content on) the display screen 114. Such a determination is based on determining that the gaze direction 132 of the user 103 is directed toward the display screen 114. Additionally or alternatively, passive engagement may be inferred based on the ongoing execution of a user-initiated task. Inferring user engagement based on the ongoing operations of the example computing device 102 does not depend on the presence or gaze of the user and, therefore, may be determined without analyzing image data and/or may be inferred regardless of whether the user 103 is present or not. However, in some examples, the settings for particular performance parameters for the selected operation mode based on passive engagement determined from an ongoing user-initiated task may differ based on whether the user 103 is present or absent.

More particularly, as shown in the illustrated example of FIG. 2, the present balanced mode 204 defines a package power limit set to "Normal" corresponding to the default package power limit defined for the processor 104. Further, the EPP parameter for the present balanced mode 204 is defined to balance performance efficiency with power efficiency. Further, in this example, the present balanced mode 204 specifies the P-state cap as corresponding to the efficient P-state (Pe) that defines the default P-state striking an optimal balance between operating frequency and power consumption. That is, the example computing device 102 is limited to P-states in which the device may operate that are no higher than the efficient P-state (e.g., the device may operate in a lower (more energy efficient) P-state but not a higher P-state (e.g., associated with Turbo)). Finally, as shown in the example of FIG. 2, the present balanced mode 204 weakly limits background activity, thereby enabling background applications to occur but still reserving processor capacity for tasks of particular interest to the user (e.g., user-initiated tasks and/or tasks associated with the ongoing interactions of the user 103 with the device 102).

In contrast with the present balanced mode 204 corresponding to when the user 103 is present and passively engaged, when the user is absent but still passive engaged, the example performance controller 124 may select an absent balanced mode 206. As mentioned above, when a user 103 is absent (e.g., not identified in the image data generated by the image sensor 116) there is no basis to infer engagement based on user gaze. Therefore, the only basis for user engagement when a user 103 is absent is based on an ongoing user-initiated task. As represented in FIG. 2, the absent balanced mode 206 defines the performance parameters substantially the same as for the present balanced mode 204 with the exception of the BAM parameter. More particular, whereas the BAM parameter for the present balanced mode 204 indicates background activities are to be weakly limited, the BAM parameter for the absent balanced mode 204 indicates background activities are to be limited by a normal or default extent defined by the background activity manager. In some examples, the performance parameters for the present balanced mode 204 and the absent balanced mode 206 may be reversed from what is shown in FIG. 2. In other examples, the performance parameters for the absent balanced mode 206 may be the same as the present balanced mode 204 such that both modes may correspond to the same generic balanced operation mode. In such examples, the balanced mode is selected based on a determination of passive engagement by the user without consideration to whether the user is present or absent. However, this does not necessarily imply that an analysis of the image data may be omitted because user engagement may be determined based on gaze direction determined from the image data.

Furthermore, in some examples, whether or not the performance parameters for the balanced modes 204, 206 are defined to be the same or different depending on whether a user 103 is present or absent, the presence or absence of the user 103 may be used to activate or deactivate a fan control mode. More particular, as shown in the illustrated example, a fan control mode 208 may be activated when the user is absent. In some examples, activation of the fan control mode adjusts or tunes the PL parameter to define a threshold limit for the package power limit that is sufficiently low to substantially prevent fan noise. The particular value for the PL parameter in such examples may be OEM platform-specific. Reducing fan noise substantially reduces or eliminates the likelihood that the example computing device 102 will be distracting to people that may be in the vicinity of the device but not engaged or otherwise interested in its operations. Furthermore, reducing fan noise is achieved by reducing fan speed, which corresponds to a reduction in power consumed by the fan. Thus, reducing fan noise can also increase battery life.

As represented in FIG. 2, when a user 103 is present but not engaged, the example performance controller 124 may select a present quiet mode 210 to define the operation of the computing device 102. As described above, a user 103 is not engaged with the operation of the computing device 102 (but still present) when the user 103 is not looking at the display screen 114 (e.g., the user is facing to the side and/or away from the screen 114) and there is no ongoing user-initiated task. In such situations, the user is not indicating any specific interest in the operation of the computing device 102 such that maintaining performance to provide a quality user experience is unnecessary. Accordingly, in some examples, the present quiet mode 210 corresponds to performance parameters that reduce (e.g., minimize) power consumption to a lowest extent relative to the other operation modes. For instance, as shown in the illustrated example of FIG. 2, the present quiet mode 210 defines a package power limit set to "Low Power" corresponding to a package power limit that is lower than the default package power limit defined for the processor 104. Further, the EPP parameter for the present quiet mode 210 is defined to give preference to reducing power consumption (at the expense of performance efficiencies). Further, in this example, the present quiet mode 210 specifies the P-state cap limiting available P-states to those lower (e.g., associated with lower operating frequencies) than the efficient P-state (Pe). Finally, as shown in the example of FIG. 2, the BAM parameter for the present quiet mode 210 indicates background activities are to be limited by a normal or default extent defined by the background activity manager.

In contrast with the present quiet mode 210 corresponding to when the user 103 is present but not engaged, when the user is both absent and not engaged, the example performance controller 124 may select an absent quiet mode 212. As represented in FIG. 2, the absent quiet mode 212 defines the performance parameters substantially the same as for the present quiet mode 210 with the exception of the P-state cap. More particular, whereas the P-state cap for the present quiet mode 210 is set to a P-state lower than the efficient P-state, the P-state cap for the absent quiet mode 212 is set to the efficient P-state. In some examples, the performance parameters for the present quiet mode 210 and the absent quiet mode 212 may be reversed from what is shown in FIG. 2. In other examples, the performance parameters for the absent quiet mode 212 may be the same as the present quiet mode 210 such that both modes may correspond to the same generic quiet operation mode. In such examples, the quiet mode is selected based on a determination that the user 103 is not engaged with the computing device 102 without consideration to whether the user is present or absent. However, this does not necessarily imply that an analysis of the image data may be omitted because user engagement (or lack thereof) may be determined based on gaze direction determined from the image data. Furthermore, as with the balanced modes 204, 206, in some examples, the fan control mode 208 may be activated when the user is absent to define a threshold limit for the package power limit that is sufficiently low to substantially prevent fan noise.

While several different operation modes 202, 204, 206, 208, 210, 212 are shown and described, with reference to FIG. 2, for implementation during different scenarios depending on the presence and/or engagement of a user 103, other operation modes associated with different combinations of values for the different performance parameters may be implemented in addition to or in the stead of those described above. Furthermore, in some examples, the particular operation mode selected at a given point in time may be based on additional contextual factors. For instance, some user-initiated tasks may be defined to trigger the interactive mode 202 (rather than a balanced mode) even when the user is not actively engaged with the operation of the computing device 102.

Furthermore, in some examples, analysis of the image data and the corresponding control of the performance parameters by the performance controller 124 for particular operation modes can be refined based on learned feedback. For example, the performance controller 124 can adjust the degree to which background activity is throttled in different circumstances based on learned data with respect to how the user indicates attentiveness to the display screen based on movements tracked by changes of the gaze of the user 103 (or another user) toward or away from the image sensor 116.

Figure 3:
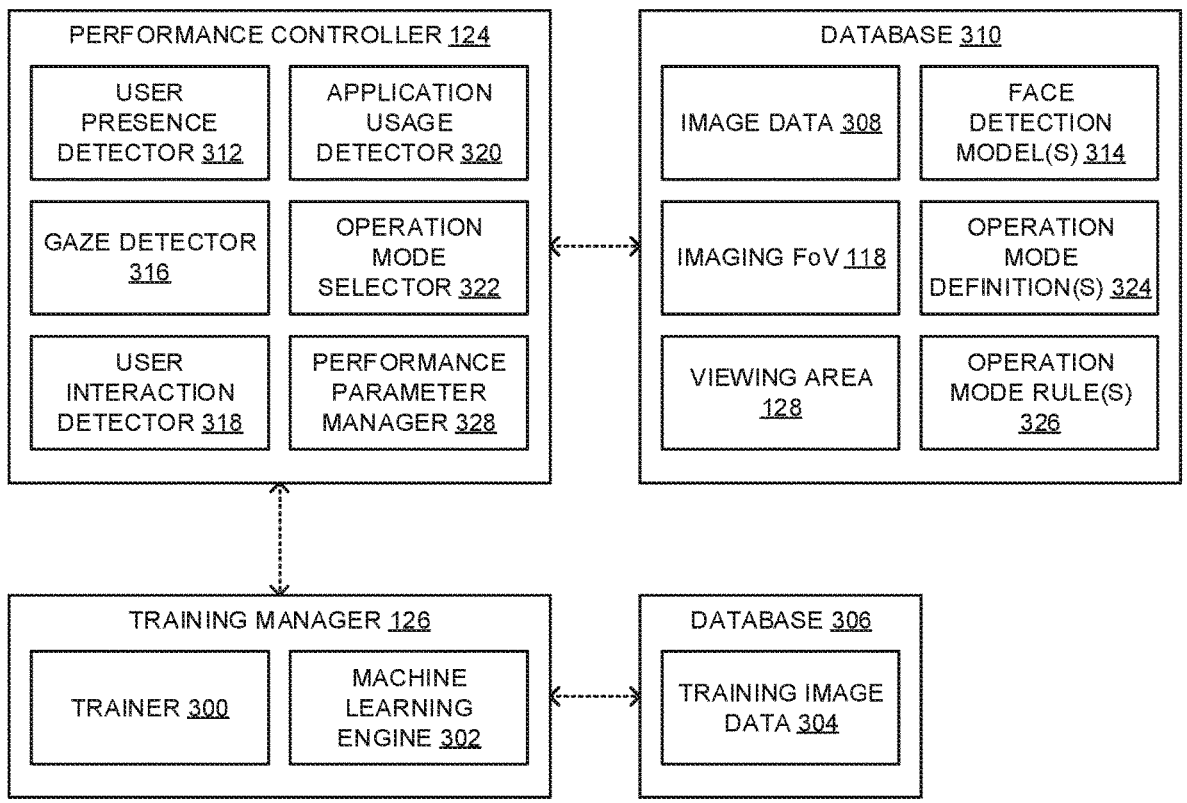
FIG. 3 is a block diagram of an example implementation of the training manager and performance controller of FIG. 1.

FIG. 3 is a block diagram of an example implementation of the training manager 126 and the performance controller 124 of FIG. 1. The example training manager 126 of this example includes a trainer 300 and a machine learning engine 302. The example trainer 300 trains the machine learning engine 302 using training image data 304 (e.g., via supervised learning) to generate one or more model(s) that are used by the performance controller 124 to identify faces and/or facial features of a user of the computing device 102. The example training image data 304 can include historical image data for the user 103 and/or other subjects. In some examples, the training image data includes image data for a particular user 103. In other examples, the training image data 304 can include image data for a plurality of human subjects. In the example of FIG. 3, the training image data 304 is stored in a database 306. In some examples, the training manager 126 includes the database 306. In other examples, the database 306 is located external to the training manager 126 in a location accessible to the training manager 126 as shown in FIG. 3.

As mentioned above, the example performance controller 124 is constructed to manage power consumption and performance of a computing device (e.g., the computing device 102 of FIG. 1) by adjusting performance parameters and/or by selecting particular operation modes with set values for the performance parameters based on user presence and/or engage with the computing device. The example performance controller 124 receives image data 308 from the image sensor 116 (e.g., a user-facing camera) of the computing device 102 of FIG. 1. The image data 308 represents objects within the example imaging FoV 118 of the image sensor 116 shown in FIG. 1. As mentioned above, in some examples, the image sensor 116 of FIG. 1 is an always-on sensor and, thus, can generate image data when the computing device 102 is in a powered-on state, including a sleep mode. The example image sensor 116 can generate the image data 308, which may be low resolution image data, at a rate of, for instance, 10 frames per second.

The image data 308 is stored in a database 310. In some examples, the performance controller 124 includes the database 310. In other examples, the database 310 is located external to the performance controller 124 in a location accessible to the performance controller 124 as shown in FIG. 3. The example databases 306, 310 of FIG. 3 may be the same storage device or different storage devices.

The example database 310 of FIG. 3 stores data regarding the imaging FoV 118 and the viewing area 128 of the display 114. Data regarding the imaging FoV 118 and the viewing area 128 of the display 114 can be provided via user input(s) based on, for instance, manufacturing specifications for the image sensor 116 and the display screen 114 (e.g., viewing angle, field of view, etc.).

The example performance controller 124 of FIG. 3 includes a user presence detector 312. The example user presence detector 312 analyzes the image data 308 using machine learning model(s) generated during training by the trainer 300. The machine learning model(s) include example face detection model(s) 314. In the example of FIG. 1, the face detection model(s) 314 are stored in the database 310. The example user presence detector 312 uses the face detection model(s) 314 to identify a presence of a user face in the imaging FoV 118.

The example performance controller 124 of FIG. 3 includes a gaze detector 316. In the example of FIG. 3, if the user presence detector 312 determines that the user 103 is present in the imaging FoV 118, the user presence detector 312 instructs the gaze detector 316 to analyze the image data 308 to determine a direction of gaze of the user 103 relative to the display screen 114. If the example user presence detector 312 determines that the user 103 is not in the imaging FoV 118, the user presence detector 312 refrains from instructing the gaze detector 316 to analyze the image data 308 to reduce power consumption, as the user presence detector 312 has already determined that the user 103 is not present relative to the computing device 102 of FIG. 1.

More particularly, the example gaze detector 316 analyzes the facial features of the user 103 in the image data 308 using the face detection model(s) 314 to determine the position of the user 103 within the viewing area 128 of the display 114, an angle of the user's gaze relative to the image sensor 116 and, thus, the user's gaze direction 132 and a corresponding user field of view 134. For example, the gaze detector 316 identifies facial feature(s) such as a mouth, nose, eye(s), and ear(s) of the user 103 in the image data 308 to determine whether the user 103 is facing the image sensor 116, looking at an angle relative to the image sensor 116, or facing opposite of the image sensor 116. Based on the angle of the user's face relative to the image sensor 116, the example gaze detector 316 determines whether the user is engaged in the operation of the computing device 102 based on whether the user is attentive or non-attentive to the display screen 114. For example, if the gaze detector 316 determines that the user 103 is facing the image sensor 116 and, thus, the display screen is within the user's field of view, the gaze detector 316 determines that the user 103 is attentive to the display screen 114 and, therefore, engaged (at least passively) in the operation of the computing device 102. If the example gaze detector 316 detects that a face of the user 103 is at an angle relative to the image sensor 116 and, thus, the display screen 114 is partially or completely removed from the user's field of view, the gaze detector 316 determines that the user is non-attentive with respect to the display screen 114 and, therefore, not engaged with the computing device 102.

The example performance controller 124 of FIG. 3 includes a user interaction detector 318 to analyze data generated by the user input detection sensor(s) 112 of FIG. 1 indicative of user interaction with the computing device 102 (e.g., via a keyboard, a mouse, a touchscreen, a microphone, etc.). In the example of FIG. 3, if the user interaction detector 318 determines that the user 103 is interacting with the computing device 102, the user is assumed to be present and actively engaged with the computing device. Accordingly, in some such examples, the user interaction detector 318 instructs the user presence detector 312 and the gaze detector 316 to refrain from analyzing the image data 308 to conserve power while the user 103 is engaged with the computing device 102. In such examples, the image sensor 116 may still generate image data in connection with other user-initiated application(s) 108 installed on the computing device 102, such as a video conferencing application.

The example performance controller 124 of FIG. 3 includes an application usage detector 320. The example application usage detector 320 determines if any application(s) (e.g., user-initiated application(s) 108 and/or background application(s) 110) installed on the computing device 102 of FIG. 1 are in operation. In some examples, the application usage detector 320 determines that a user is engaged (at least passively) in the operation of the computing device 102 when a user-initiated application 108 is performing an ongoing user-initiated task. In some examples, this determination can be made independent of whether the user is present or absent and independent of whether the user is looking toward the display screen 114. Accordingly, in some examples, when there is an ongoing user-initiated application 108, the application usage detector 320 instructs the user presence detector 312 and the gaze detector 316 to refrain from analyzing the image data 308 to conserve power while the user 103 is engaged with the computing device 102.

The gaze detector 316, the example user interaction detector 318, and the example application usage detector 320 are all collectively referred to herein as engagement detectors because they can each be used to determine the engagement of a user with the computing device 102. The example user interaction detector 318 determines active engagement when the user is actively interacting with the computing device 102. The example gaze detector 316 determines passive engagement when the user is looking toward the computing device 102. The example application usage detector 320 determines passive engagement when an user-initiated task is ongoing on the computing device 102.

The example performance controller 124 of FIG. 3 includes an example operation mode selector 322 to select one of a plurality of predefined operation mode definitions 324 for the computing device based on user presence and/or engagement determined by one or more of the user presence detector 312, the gaze detector 316, the user interaction detector 318, and/or the application usage detector 320. In some examples, the different operation mode definitions 324 define particular settings for a set of performance parameters including, for example, a PL parameter, an EPP parameter, a P-state cap, and a BAM parameter. In some examples, the different operation mode definitions 324 are stored in the database 310. In some examples, the operation mode selector 322 selects a particular operation mode definition 324 based on operation mode rule(s) 326 stored in the database 310. The example operation mode rule(s) 326 define the conditions relating to user presence and/or engagement that trigger the implementation of particular operation modes. For example, a first rule may dictate that when a user 103 is present and the user 103 is actively engaged in the operation of the computing device, the computing device 102 is to operate according to an interactive mode (e.g., the interactive mode 202 of FIG. 2). Additional rules may dictate when each of the other operation modes 204, 206, 208, 210, 212 of FIG. 2 (and/or any other operation mode) is to be implemented.

The example performance controller 124 of FIG. 3 includes a performance parameter manager 328 to set or adjust performance parameters based on a particular operation mode definition 324 identified by the operation mode selector 322. That is, when the example operation mode selector 322 determines that the computing device 102 is to switch to a different operation mode (based on a change in user presence and/or engagement), the performance parameter manager 328 assigns the relevant value for each performance parameter defined in the new operation mode to cause the computing device to begin operating according to the parameter settings of the selected operation mode. In some examples, the performance parameter manager 328 may assign values to particular performance parameters independent of a particular operation mode definition 324 stored in the database. Further, in some examples, the performance parameter manager 328 may define new operation mode definitions 324 and/or operation mode rules and/or revise existing definitions and/or rules based an analysis of pattern(s) and/or trend(s) with respect to user behavior.

While an example manner of implementing the training manager 126 of FIG. 1 is illustrated in FIG. 3, one or more of the elements, processes and/or devices illustrated in FIG. 3 may be combined, divided, re-arranged, omitted, eliminated and/or implemented in any other way. Further, the example trainer 300, the example machine learning engine 302, the example training database 306, and/or, more generally, the example training manager 126 of FIG. 3 may be implemented by hardware, software, firmware and/or any combination of hardware, software and/or firmware. Thus, for example, any of the example trainer 300, the example machine learning engine 302, the example training database 306 and/or, more generally, the example training manager 126 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example trainer 300, the example machine learning engine 302, and/or the example training database 306 is/are hereby expressly defined to include a non-transitory computer readable storage device or storage disk such as a memory, a digital versatile disk (DVD), a compact disk (CD), a Blu-ray disk, etc. including the software and/or firmware. Further still, the example training manager 126 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the performance controller 124 of FIG. 1 is illustrated in FIG. 3, one or more of the elements, processes and/or devices illustrated in FIG. 3 may be combined, divided, re-arranged, omitted, eliminated and/or implemented in any other way. Further, the example database 310, user presence detector 312, the example gaze detector 316, the example user interaction detector 318, the example application usage detector 320, the example operation mode selector 322, the example performance parameter manager 328, and/or, more generally, the example performance controller 124 of FIG. 3 may be implemented by hardware, software, firmware and/or any combination of hardware, software and/or firmware. Thus, for example, any of the example database 310, user presence detector 312, the example gaze detector 316, the example user interaction detector 318, the example application usage detector 320, the example operation mode selector 322, the example performance parameter manager 328 and/or, more generally, the example performance controller 124 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 310, user presence detector 312, the example gaze detector 316, the example user interaction detector 318, the example application usage detector 320, the example operation mode selector 322, and/or the example performance parameter manager 328 is/are hereby expressly defined to include a non-transitory computer readable storage device or storage disk such as a memory, a digital versatile disk (DVD), a compact disk (CD), a Blu-ray disk, etc. including the software and/or firmware. Further still, the example performance controller 124 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
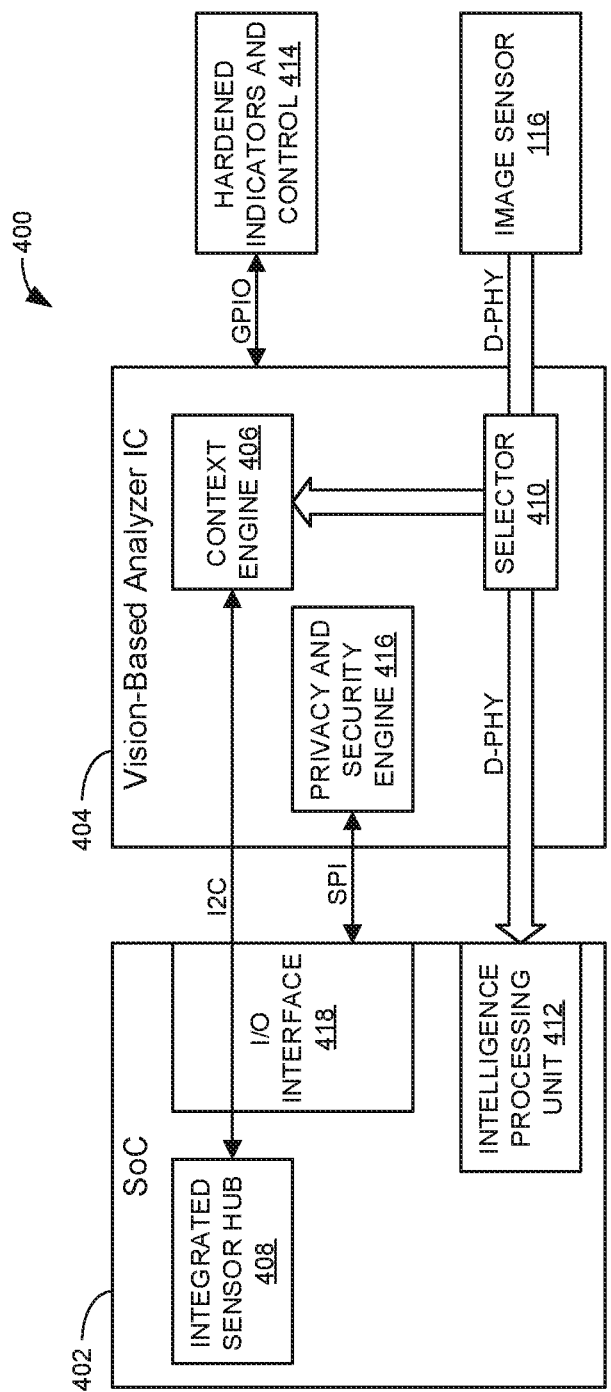
FIG. 4 is a schematic illustration of an example system to implement the computing device of FIG. 1.

FIG. 4 is a schematic illustration of an example system 400 to implement the computing device of FIG. 1. In this example, the system 400 includes a System-on-a-Chip (Soc) 402 and a companion die referred to herein as a vision-based analyzer integrated circuit (IC) 404. In some examples, the SoC 402 includes the processor 104 of FIG. 1. Further, in some examples, the SoC 402 and the vision-based analyzer IC 404 perform different functions associated with the implementation of the performance controller 124 and/or the training manager 126 of FIGS. 1 and/or 3. More particularly, in some examples, the vision-based analyzer IC 404 includes a context engine 406 that implements the user presence detector 312 and the example gaze detector 316 to perform an initial analysis of image data generated by the image sensor 116 to determine whether a user is present and/or engaged with (e.g., looking at) the computing device 102. The example vision-based analyzer IC 404 is implemented as a separate die to the SoC 402 to be specifically designed to perform this vision-based analysis with relatively low power (e.g., around 10 mW) for an "always-on" implementation. Following the analysis of the image data, the example context engine 406 may transmit (e.g., via an I²C serial bus) an indication of the determination of user presence and/or engagement to an integrated sensor hub (ISH) 408 of the SoC 402 for further processing (e.g., to identify an appropriate operation mode and to adjust corresponding performance parameters accordingly). As shown in the illustrated example, the vision-based analyzer IC 404 is communicatively coupled between the image sensor 116 and the SoC 402 to enable the context engine to perform the initial low power analysis of image data. However, when a user 103 initiates an operation that involves the use of the image sensor 116 (e.g., for a video conferencing call), an example selector 410 may forward the image data directly to an intelligence processing unit (IPU) 412 of the SoC 402 and bypass the context engine 406.

In addition to receiving image data, the example vision-based analyzer IC 404 may also receive hardened indicators and control inputs 414 via general purpose inputs/outputs (GPIOs) of the vision-based analyzer IC 404. Further, in some examples, the vision-based analyzer IC 404 includes a privacy and security engine 416 to maintain the security and/or integrity of the vision-based analyzer IC 404. In some such examples, the privacy and security engine 416 also communicates with the SoC 402 via an I/O interface 418 of the SoC 402.

Figure 5:
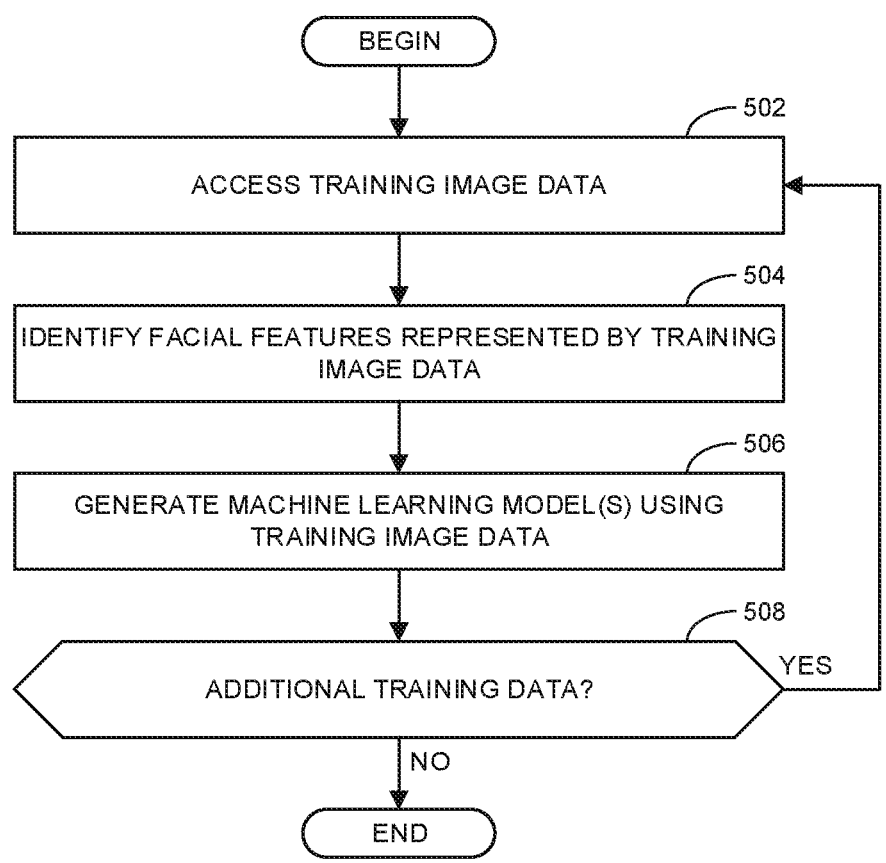
FIG. 5 is a flowchart representative of example machine readable instructions that may be executed to implement the example training manager of FIGS. 1 and/or 3.
Figure 6:
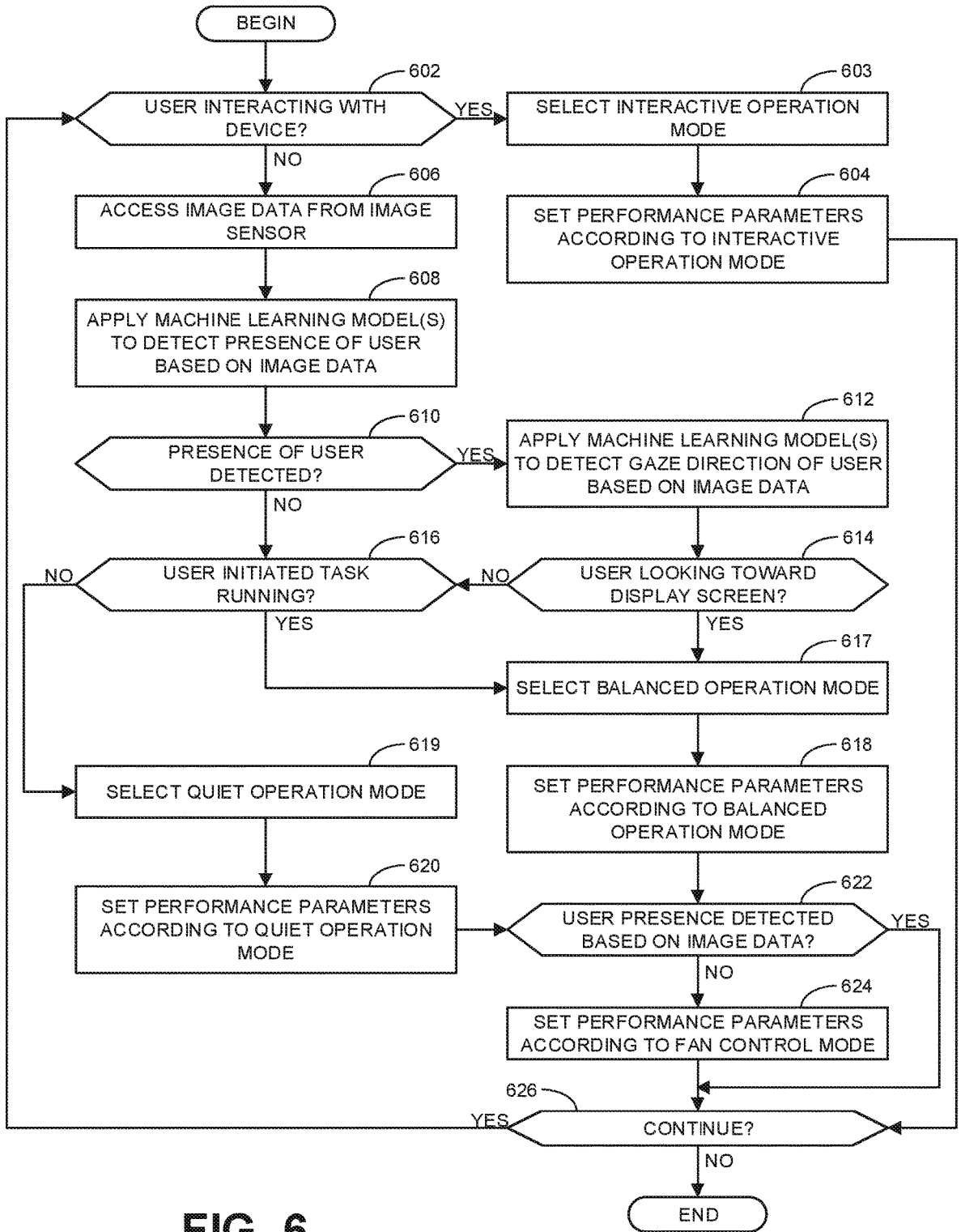
FIG. 6 is a flowchart representative of example machine readable instructions that may be executed to implement the example performance controller of FIGS. 1 and/or 3.
Figure 7:
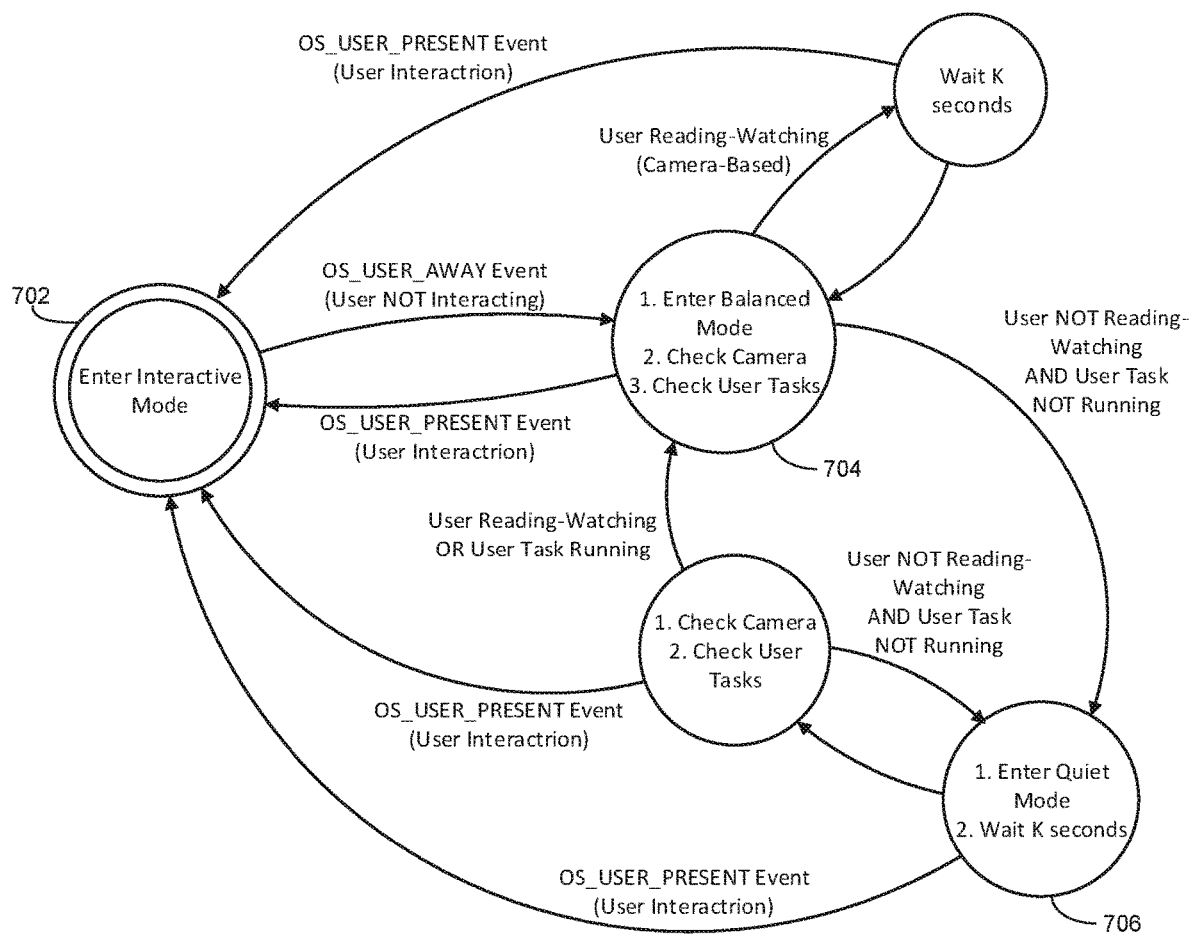
FIG. 7 is an example machine state diagram corresponding to the implementation of the example machine readable instructions of FIG. 6.

Flowcharts representative of example hardware logic, machine readable instructions, hardware implemented state machines, and/or any combination thereof for implementing the example training manager 126 and/or the example performance controller 124 of FIGS. 1 and/or 3 is shown in FIGS. 5-7. The machine readable instructions may be one or more executable programs or portion(s) of an executable program for execution by a computer processor such as the processor(s) 912, 1012 shown in the example processor platform 900, 1000 discussed below in connection with FIGS. 9 and 10. The program may be embodied in software stored on a non-transitory computer readable storage medium such as a CD-ROM, a floppy disk, a hard drive, a DVD, a Blu-ray disk, or a memory associated with the processor(s) 912, 1012, but the entire program and/or parts thereof could alternatively be executed by a device other than the processor(s) 912, 1012 and/or embodied in firmware or dedicated hardware. Further, although the example program is described with reference to the flowcharts illustrated in FIGS. 5-7, many other methods of implementing the example training manager 126 and/or the example performance controller 124 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 5 is a flowchart representative of example machine readable instructions that, when executed, implement the example training manager 126 of FIGS. 1 and/or 3. In the example of FIG. 5, the training manager 126 trains the example performance controller 124 of FIGS. 1 and/or 3 using training image data, which is generated for one or more users who may or may not be using the example computing device 102 of FIG. 1. As disclosed herein, the example training manager 126 generates machine learning models that are used by the performance controller 124 of FIGS. 1 and/or 3 to control the performance and power consumption of the computing device 102 based on user presence and/or engagement with the device 102.

The example instructions of FIG. 5 can be executed by one or more processors of, for instance, the computing device 102, another computing device, and/or a cloud-based device. The example instructions of FIG. 5 can be executed in substantially real-time as the training image data received by the training manager 126 or at some time after the training image data is received by the training manager 126. The example training manager 126 can communicate with the performance controller 124 via one or more wired or wireless communication protocols.

The example program of FIG. 5 begins at block 502 where the example trainer 300 accesses training image data 304. The training image data 304 can be stored in the database 306. In some examples, the training image data 304 is generated for one or more users of the computing device 102. In some such examples, the training image data 304 can be received from the performance controller 124 and/or directly from the image sensor 116 of the computing device 102. In some other examples, the training image data 304 is generated for people who are not user(s) of the computing device 102.

At block 504, the example trainer 300 identifies facial features represented by the training image data 304. As an example, based on the training image data 304, the trainer 300 identifies facial features such as the nose, ears, mouth, forehead, etc. At block 506, the example trainer 300 generates one or more machine learning model(s) (e.g., the face detection model(s) 314) via the machine learning engine 302 and based on the training image data 304 defining user presence and/or engagement based on detected facial features. For example, the trainer 300 uses the training image data 304 to generate the face detection model(s) 314 that are used by the performance controller 124 to determine whether a user (e.g., the user 103) is present in the imaging FoV 118 and/or is looking at (engaged in) the content rendered on the display screen 114.

The example trainer 300 can continue to train the performance controller 124 using different datasets and/or datasets having different levels of specificity. Accordingly, at block 508, the example trainer 300 determines whether there is additional training image data 304. If so, control returns to block 502 to repeat the process. For example, the trainer 300 can generate a first face detection model 314 to determine if the user is present in the imaging FoV 118 and a second face detection model 314 to determine if the user's face is turned to the right or left of the image sensor 116. If there is no additional training data, the example process end.

FIG. 6 is a flowchart representative of example machine readable instructions that, when executed by a processor, implement the example performance controller 124 of FIGS. 1 and/or 3. In the example of FIG. 6, the performance controller 124 generates instruction(s) to switch between different operation modes and/or, more particularly, to control particular performance parameters defining the operation of the computing device 102 based on a presence and/or engagement of a user (e.g., the user 103). The example instructions of FIG. 6 can be executed by one or more processors of, for instance, the computing device 102, another user device, and/or a cloud-based device. As mentioned above, in some examples, at least some of the instructions of FIG. 6 are executed by a processor operating in a low power mode, such as the context engine 406 of the vision-based analyzer IC 404 of FIG. 4, to reduce power consumption in processing and analyzing the image data. The example instructions of FIG. 6 can be executed in substantially real-time as the image sensor 116 generates image data and/or as a user interacts with the computing device 102.

The example program of FIG. 6 begins at block 602 where the example user interaction detector 318 determines whether a user (e.g., the user 103) is interacting with the computing device 102. If so, control advances to block 603 where the example operation mode selector 322 selects an interactive operation mode. Thereafter, at block 604, the example performance parameter manager 328 sets performance parameters according to the interactive operation mode. Thereafter, control advances to block 626. Returning to block 602, if the user 103 is not interacting with the device, control advances to block 606. In some examples, control advances to block 606 only after a threshold period of time (e.g., 5 seconds, 10, seconds, 30 seconds, etc.) has elapsed since the user 103 stopped interacting with the computing device 102. This delay threshold serves to prevent the constant switching between operation modes when, for example, a user momentarily pauses from active interactions with the computing device 102.

At block 606, the example user presence detector 312 accesses the image data 308 from the image sensor 116. At block 608, the example user presence detector 312 applies machine learning model(s) (e.g., the face detection model(s) 314 generated by the training manager 126) to detect the presence of a user based on the image data 308. At block 610, the example user presence detector 312 determines if the presence of a user is detected. If so, control advances to block 612 where the example gaze detector 316 applies machine learning model(s) (e.g., the face detection model(s) 314 generated by the training manager 126) to detect a gaze direction 132 of the user based on the image data 308. At block 614, the example gaze detector 316 determines whether the user is looking toward the display screen 114. In some examples, this determination is based on whether the gaze direction 132 is directed toward the screen 114. Additionally or alternatively, the example gaze detector 316 may determine the user is looking toward the display screen 114 so long as the display screen 114 is within the user FoV 134. If the user is looking toward the display screen 114, control advances to block 617 where the example operation mode selector 322 selects a balanced operation mode. Thereafter, at block 618, the example performance parameter manager 328 sets the performance parameters according to the balanced operation mode.

Returning to block 610, if the example user presence detector 312 determines that no user is present (e.g., no user is identified in the image data 308), control advances to block 616. Similarly, if the example gaze detector 316 determines (at block 614) that the user is not looking toward the display screen 114, control advances to block 616. In some examples, control advances to block 616 from block 610 and/or 614 only after a threshold period of time (e.g., 5 seconds, 10, seconds, 30 seconds, etc.) has elapsed since the presence of the user was last detected (at block 610) or the user was last looking at the display screen 114 (determined at block 614). Such delay thresholds serve to prevent the constant switching between operation modes when, for example, the user leaves the imaging FoV 118 momentarily and/or looks away from the display screen 114 momentarily but then returns to engagement with the computing device 102.

At block 616, the example application usage detector 320 determines whether a user-initiated task is running. If so, control advances to block 617 where the example operation mode selector 322 again selects the balanced operation mode. Thereafter, at block 618, the example performance parameter manager 328 sets the performance parameters according to the balanced operation mode. In some examples, the balanced operation mode selected based on a determination that the user is looking toward the display screen 114 (block 614) and the balanced operation mode selected based on the determination that a user-initiated task is running (block 616) are the same operation mode (e.g., the same performance parameter settings). In other examples, variations in the balanced operation mode may be implemented based on whether the user is looking at the display screen 114 and/or whether there is an ongoing user-initiated task. Thereafter, control advances to block 622. Returning to block 616, if the example application usage detector 320 determines that no user-initiated task is running, control advances to block 619 where the example operation mode selector 322 selects a quiet operation mode. Thereafter, at block 620, the example performance parameter manager 328 sets performance parameters according to the quiet operation mode. Thereafter, control advances to block 622.

At block 622, the example user presence detector 312 again determines whether user presence is detected based on the image data 308. If not (e.g., the user is determined to be absent), control advances to block 624 where the example performance parameter manager 328 sets performance parameters according to a fan control mode. That is, in some examples, the example performance parameter manager 328 adjusts either the balanced operation mode (block 618) or the quiet operation mode (block 620) so that the fan is run at a relatively low power to reduce (e.g., prevent) fan noise when the user is not present. Thereafter, control advances to block 626. If, at block 622, the example user presence detector 312 determines that the user is present, control advances directly to block 626. At block 626, the example performance controller 124 determines whether to continue the process. If so, control returns to block 602. Otherwise, the example process of FIG. 6 ends.

FIG. 7 is an example machine state diagram corresponding to the implementation of the example machine readable instructions of FIG. 6. As represented in the illustrated example, whenever the user interaction detector 318 detects a user interaction with the computing device 102, the performance parameter manager 328 switches the computing device 102 to a first machine state 702 corresponding to an interactive mode. If the example user interaction detector 318 determines that the user stops actively interacting with the computing device 102, the performance parameter manager 328 switches the computing device 102 to a second machine state 704 corresponding to a balanced mode. When in the balanced mode, the example user presence detector 312 and the gaze detector 316 analyze image data from the image sensor 116 to determine the presence and/or engagement of the user. Further, the example application usage detector 320 determines whether there are any ongoing user-initiated tasks. If the user remains present and engaged (e.g., is looking at the display screen 114) and/or there is an ongoing user-initiated task, the example computing device 102 remains in the balanced mode until user interactivity is again detected. On the other hand, if the user is no longer engaged with (e.g., looks away from) the computing device 102 and there is no ongoing user-initiated task, the example performance parameter manager 328 switches the computing device 102 to a third machine state 706 corresponding to a quiet mode. The computing device 102 then remains in the quiet mode until the user again interacts with the device 102 (thereby triggering the device to operate in the interactive mode) or the image data indicates the user is again present and engaged with (e.g., looking toward) the device and/or there is an ongoing user-initiated task (thereby triggering the device to operating in the balanced mode).

Figure 8:
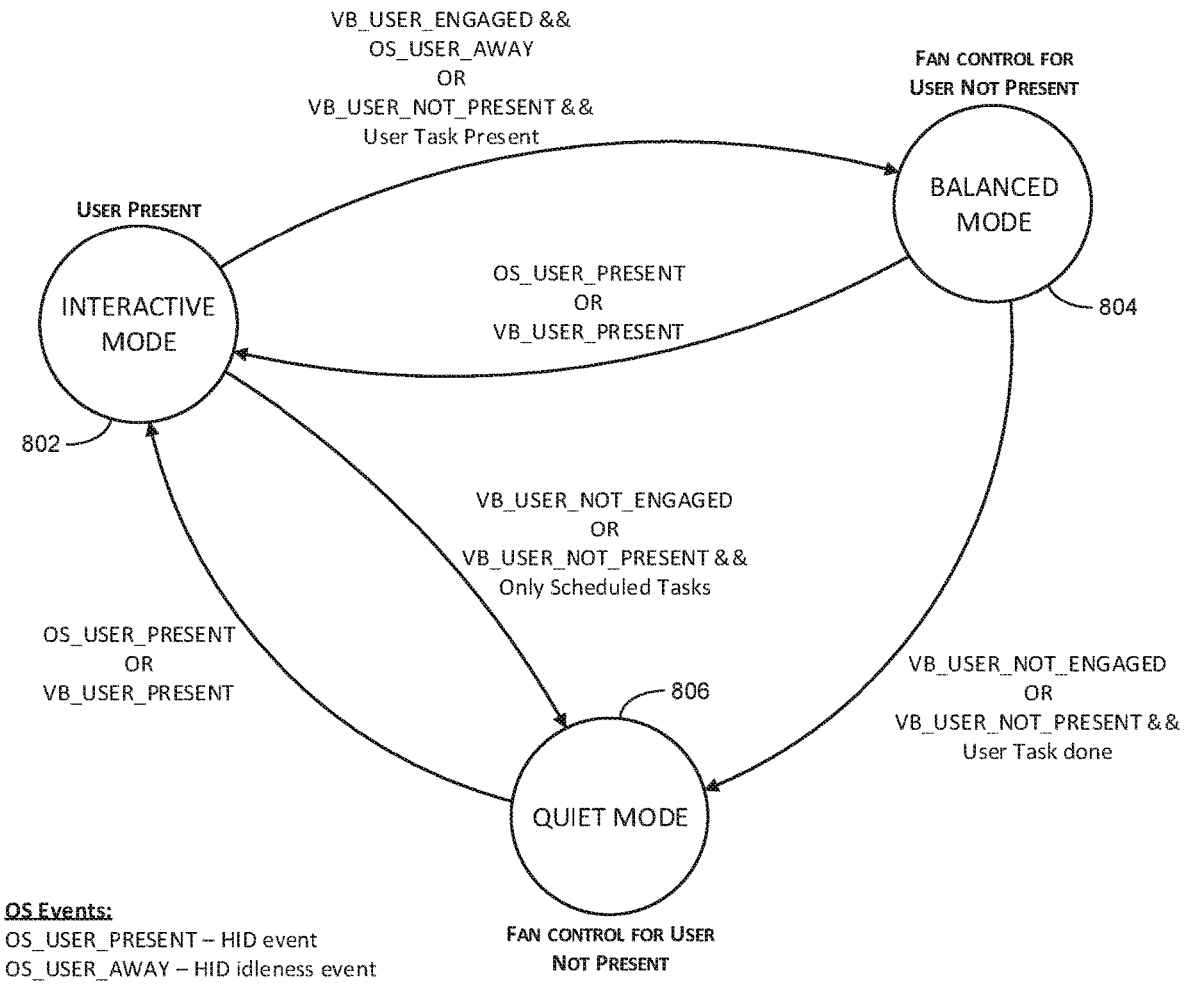
FIG. 8 is another example machine state diagram corresponding to the implementation of the example machine readable instructions of FIG. 6.

FIG. 8 is another example machine state diagram corresponding to the implementation of the example machine readable instructions of FIG. 6. The state diagram of FIG. 8 is similar to the state diagram in FIG. 7 in the FIG. 8 includes a first machine state 802 corresponding to an interactive mode, a second machine state 804 corresponding to a balanced mode, and a third machine state 806 corresponding to a quiet mode. However, FIG. 8 differs from FIG. 7 in the conditions and/or triggers that cause the system to switch from one state to another. In the illustrated example of FIG. 8, the conditions that define a change of state correspond to the occurrence of one or more events including operating system (OS) events and visual based (VB) events).

In this example, OS events are associated with user interactions (or non-interaction) with the computing device 102. More particularly, an OS_USER_PRESENT event corresponds to a human interface device (HID) event in which the user 103 is determined to be interacting (e.g., actively engaging) with the computing device 102 (e.g., as detected by the user interaction detection 318). An OS_USER_AWAY event corresponds to a HID idleness event. In some examples, a HID idleness event occurs when no HID event is detected for a threshold period of time (e.g., 10 seconds, 30 seconds, 1 minute, 2 minutes, 5 minutes, etc.).

Further, VB events are events based on analysis of image data provided by the image sensor 116. In some examples, VB event are based on the determination of the presence of absence of a user 103. In some examples, VB event are based on the determination of the engagement (e.g., passive engagement) when the user 103 is looking at the computing device 102 or non-engagement when the user 103 is not looking toward the computing device. More particularly, in some examples, a VB_USER_PRESENT event corresponds to when the user is detected as being present (e.g., as determined by the user presence detector 312). A VB_USER_ENGAGED event corresponds to when the user is present and is looking toward the computing device (e.g., as determined by the gaze detector 316). A VB_USER_NOT_ENGAGED event corresponds to when the user is detected as being present but is looking away from the computing device 102. In some examples, the VB_USER_NOT_ENGAGED event occurs only after a threshold period of time (e.g., 1 second, 5 seconds, 15 seconds, etc.) has passed while the user remains looking away from the computing device. Finally, a VB_USER_NOT_PRESENT event corresponds to when the user is not present at the computing device (e.g., the user presence detector 312 does not identify the user within the image data of the image sensor 116). In some examples, the VB_USER_NOT_PRESENT event occurs only after a threshold period of time (e.g., 5 seconds, 15 seconds, 30 seconds, etc.) has passed during which the user 103 is not detected within the image data.

In some examples, different ones of the events may trigger the computing device 102 to switch from one state (or mode) to another state (or mode). In some examples, the occurrence of multiple events at the same time may define a particular condition to switch between states. For instance, as shown in the illustrated example, when the computing device 102 is operating in the first state 802 (e.g., the interactive mode), one condition that will cause the device to switch to the second state 804 (e.g., the balanced mode) includes the occurrence of both (1) the VB_USER_ENGAGED event and (2) the OS_USER_AWAY event occurs. In some examples, a particular event may combine with a separate ongoing condition to trigger the switch between states. For instance, where there is both (1) the occurrence of a VB_USER_NOT_PRESENT event and (2) a user task is present (e.g., there is an ongoing user-initiated task), the example computing device 102 will switch from the first state 802 to the second state 804. By contrast, when the occurrence of a VB_USER_NOT_PRESENT event is combined with a situation where there are only scheduled tasks (e.g., no ongoing user-initiated tasks), the example computing device 102 will switch from the first state 802 to the third state 806.

As shown in the illustrated example, both the balanced mode (second state 804) and the quiet mode (third state 806) may be implemented in connection with a fan control mode when the user 103 is not present. By contrast, in this example, the user 103 is necessarily assumed to be present in the interactive mode (first state 802) such that the fan control option is suppressed.

Figure 9:
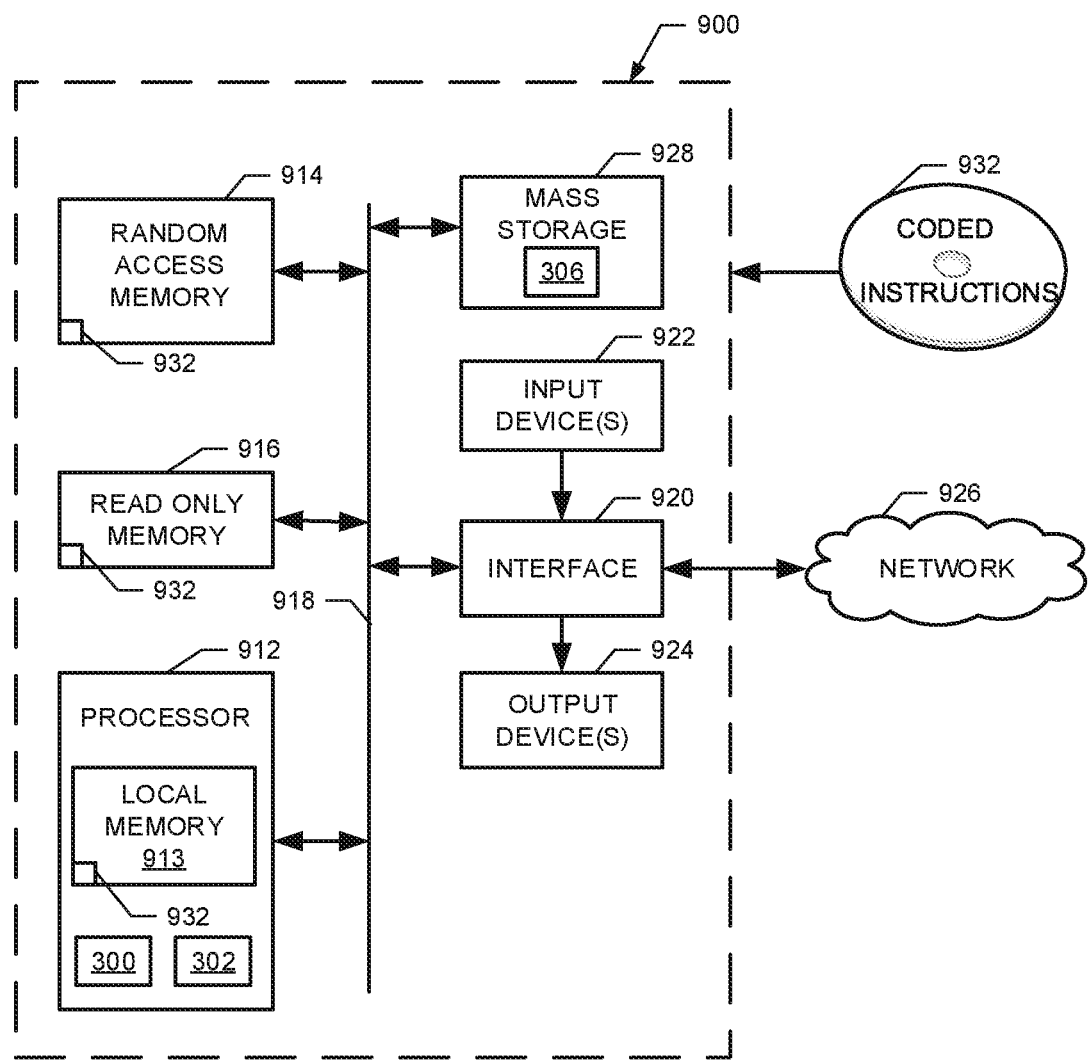
FIG. 9 is a block diagram of an example processing platform structured to execute the instructions of FIG. 5 to implement the example training manager of FIGS. 1 and/or 3.

FIG. 9 is a block diagram of an example processor platform 900 structured to execute the instructions of FIG. 5 to implement the training manager 126 of FIGS. 1 and/or 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example trainer 300, and the example machine learning engine 302.

The processor 912 of the illustrated example includes a local memory 913 (e.g., a cache). The processor 912 of the illustrated example is in communication with a main memory including a volatile memory 914 and a non-volatile memory 916 via a bus 919. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 5 may be stored in the mass storage device 928, in the volatile memory 914, in the non-volatile memory 916, and/or on a removable non-transitory computer readable storage medium such as a CD or DVD.

Figure 10:
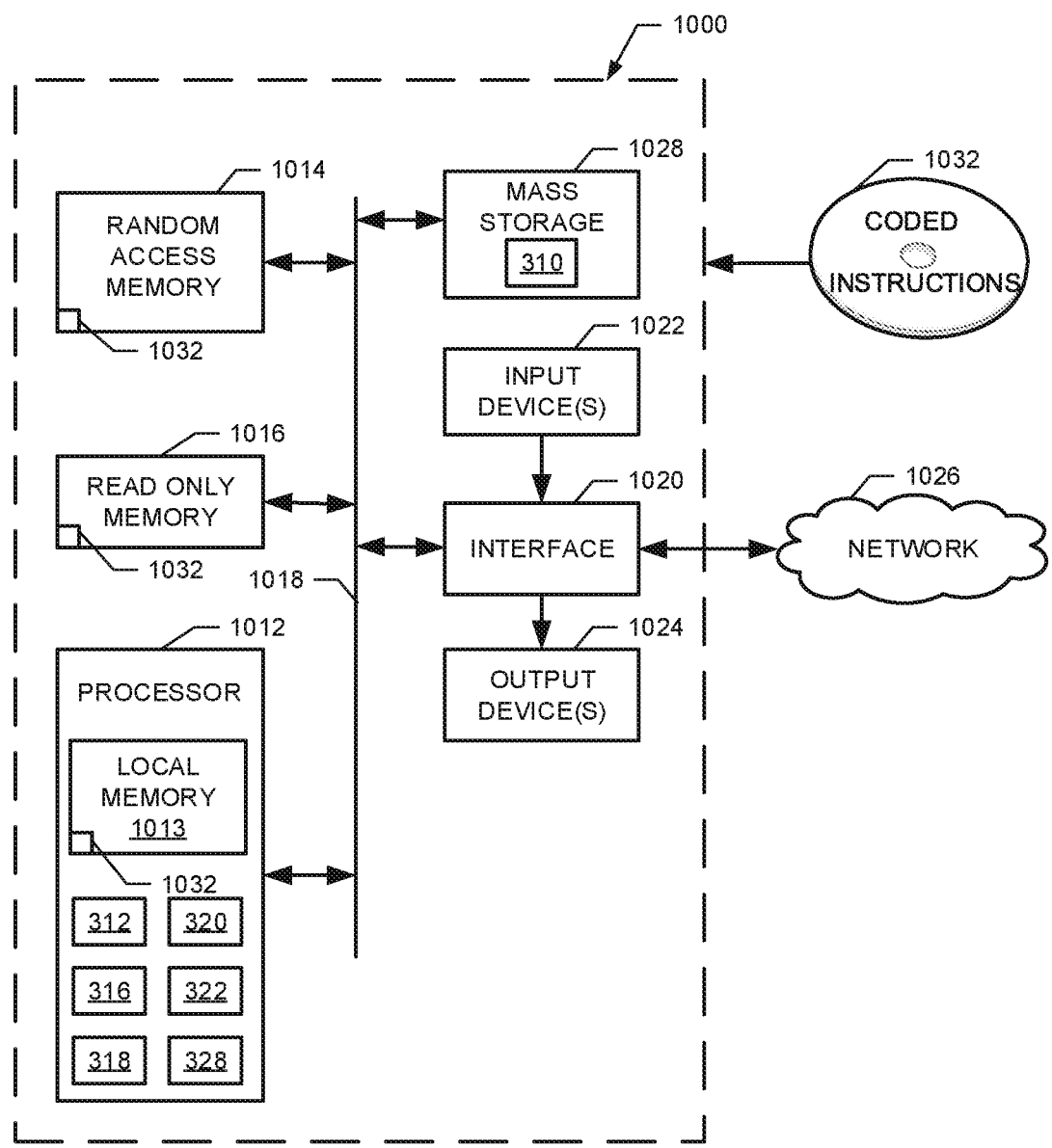
FIG. 10 is a block diagram of an example processing platform structured to execute the instructions of FIG. 6 to implement the example performance controller of FIGS. 1 and/or 3.

FIG. 10 is a block diagram of an example processor platform 1000 structured to execute the instructions of FIG. 6 to implement the example performance controller 124 of FIGS. 1 and/or 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example user presence detector 312, the example gaze detector 316, the example user interaction detector 318, the example application usage detector 320, the example operation mode selector 322, and the example performance parameter manager 328. As described above, in other examples, at least the user presence detector 312 and the example gaze detector 316 may be implemented on a discrete IC that is separate from the main processor 1012.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. 6 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that enable the operation of a computing device with relatively high performance efficiency when the user is engaged with the operation of the device (for enhance user experience) and that conserves power whenever the user is not present and/or not engaged in the operation of the device. This efficient mode of operation is accomplished by determining when the user is present and/or engaged with the computing device based on an analysis of image data captured by an image sensor of the device. In some examples, the computing device may switch between multiple different modes of operation associated with varying levels of performance and power consumption depending on the nature of engagement of the user with the device. For instance, when the user is actively interacting with the device, the device may switch to an interactive operation mode that provides the highest level of performance efficiency. If the user is not actively interacting with the device but still engaged by, for example, showing at least a passive interest in the content of a display screen (based on a direction of the user's gaze), a balanced operation mode that still provides adequate performance for a positive user experience but also conserves power as appropriate may be implemented. In some examples, a balanced operation mode may be implemented when the user shows an interest in the operation of the device based on an ongoing user-initiated task regardless of whether the user is looking at the device or even present in the vicinity of the device. When the user is not engaged with the operation of the computing device, the device may switch to a quiet operation mode that conserves even a greater amount of power. The disclosed methods, apparatus and articles of manufacture are accordingly directed to one or more improvement(s) in the functioning of a computer.

Example methods and apparatus to manage power and performance of computing devices based on user presence are disclosed herein. Further examples and combinations thereof include the following:

Example 1 includes an apparatus to manage power consumption and performance of a computing device, the apparatus comprising an engagement detector to determine an engagement of a user with the computing device based on at least one of image data generated by an image sensor of the computing device or an application running on the computing device, and an operation mode selector to select one of a plurality of operation modes for the computing device based on a level of engagement of the user in operation of the computing device, the plurality of operation modes including (1) a first operation mode associated with the computing device operating at a first performance level and a first power level and (2) a second operation mode associated with the computing device operating at a second performance level and a second power level, the first performance level being higher than the second performance level, the first power level being higher than the second power level.

Example 2 includes the apparatus of example 1, further including a performance parameter manager to set a plurality of performance parameters associated with the computing device based on whether the operation mode selector selected the first operation mode or the second operation mode.

Example 3 includes the apparatus of example 2, wherein the performance parameter manager is to assign a first limit to a package power limit for the computing device when the first operation mode is selected, and assign a second limit to the package power limit for the computing device when the second operation mode is selected, the first limit higher than the second limit.

Example 4 includes the apparatus of any one of examples 2 or 3, wherein the performance parameter manager is to assign a first value to an energy performance preference parameter for the computing device when the first operation mode is selected, and assign a second value to the energy performance preference parameter for the computing device when the second operation mode is selected, the first value indicating a higher priority is given to performance than the second value, the first value indicating a lower priority is given to power saving than the second value.

Example 5 includes the apparatus of example 4, wherein the second value corresponds to a balance in priorities between performance and power saving.

Example 6 includes the apparatus of any one of examples 2-5, wherein the performance parameter manager is to set a first power state cap for the computing device when the first operation mode is selected, and set a second power state cap for the computing device when the second operation mode is selected, the first power state cap enabling higher power consuming power states than the second power state cap.

Example 7 includes the apparatus of example 6, wherein the first power state cap does not limit available power states of the computing device and the second power state cap corresponds to an efficient power state for the computing device.

Example 8 includes the apparatus of example 6, wherein the first power state cap corresponds to an efficient power state for the computing device and the second power state cap corresponds to less than the efficient power state.

Example 9 includes the apparatus of any one of examples 2-8, wherein the performance parameter manager is to set a first background activity limit for the computing device when the first operation mode is selected, and set a second background activity limit for the computing device when the second operation mode is selected, the first background activity limit limiting background activity more than the second background activity limit.

Example 10 includes the apparatus of any one of examples 1-9, further including a user presence detector to determine a presence of the user relative to the computing device based on the image data.

Example 11 includes the apparatus of example 10, wherein the operation mode selector is to select the first operation mode when the user is present and actively engaged with the computing device, and select the second operation mode when the user is present and passively engaged with the computing device.

Example 12 includes the apparatus of example 10, wherein the operation mode selector is to select the first operation mode when the user is present and engaged with the computing device, and select the second operation mode when the user is present but not engaged with the computing device.

Example 13 includes the apparatus of example 10, wherein the operation mode selector is to select the first operation mode when the user is absent and the computing device is implementing an ongoing user-initiated task, and select the second operation mode when the user is absent and no ongoing user-initiated task is being implemented.

Example 14 includes the apparatus of any one of examples 1-13, wherein the plurality of operation modes includes a third operation mode associated with the computing device operating at a third performance level and a third power level, the third performance level being lower than the second performance level, the third power level being lower than the second power level.

Example 15 includes the apparatus of example 14, wherein the operation mode selector is to select the first operation mode when the user is actively engaged with computing device, select the second operation mode when the user is passively engaged with the computing device, and select the third operation mode when the user is not engaged with the computing device.

Example 16 includes the apparatus of any one of examples 14 or 15, wherein the engagement detector includes a user interaction detector, the user interaction detector to detect the user is actively engaged with the computing device based on detection of user inputs received at the computing device.

Example 17 includes the apparatus of any one of examples 14-16, wherein the engagement detector includes a gaze detector, the gaze detector to determine a direction of gaze of the user based on the image data, and determine whether the user is passively engaged or not engaged based on the direction of gaze of the user.

Example 18 includes the apparatus of any one of examples 14-17, wherein the engagement detector includes an application usage detector, the application usage detector to determine whether the user is passively engaged or not engaged based on whether the application running on the computing device corresponds to an ongoing user-initiated task.

Example 19 includes a non-transitory computer readable medium comprising instructions that, when executed, cause at least one processor to at least determine an engagement of a user with a computing device based on at least one of image data generated by an image sensor of the computing device or an application running on the computing device, and select one of a plurality of operation modes for the computing device based on a level of engagement of the user in operation of the computing device, the plurality of operation modes including (1) a first operation mode associated with the computing device operating at a first performance level and a first power level and (2) a second operation mode associated with the computing device operating at a second performance level and a second power level, the first performance level being higher than the second performance level, the first power level being higher than the second power level.

Example 20 includes the non-transitory computer readable medium of example 19, wherein the instructions further cause the at least one processor to set a plurality of performance parameters associated with the computing device based on the selection of the first operation mode or the second operation mode.

Example 21 includes the non-transitory computer readable medium of example 20, wherein the instructions further cause the at least one processor to assign a first limit to a package power limit for the computing device when the first operation mode is selected, and assign a second limit to the package power limit for the computing device when the second operation mode is selected, the first limit higher than the second limit.

Example 22 includes the non-transitory computer readable medium of any one of examples 20 or 21, wherein the instructions further cause the at least one processor to assign a first value to an energy performance preference parameter for the computing device when the first operation mode is selected, and assign a second value to the energy performance preference parameter for the computing device when the second operation mode is selected, the first value indicating a higher priority is given to performance than the second value, the first value indicating a lower priority is given to power saving than the second value.

Example 23 includes the non-transitory computer readable medium of example 22, wherein the second value corresponds to a balance in priorities between performance and power saving.

Example 24 includes the non-transitory computer readable medium of any one of examples 20-23, wherein the instructions further cause the at least one processor to set a first power state cap for the computing device when the first operation mode is selected, and set a second power state cap for the computing device when the second operation mode is selected, the first power state cap enabling higher power consuming power states than the second power state cap.

Example 25 includes the non-transitory computer readable medium of example 24, wherein the first power state cap does not limit available power states of the computing device and the second power state cap corresponds to an efficient power state for the computing device.

Example 26 includes the non-transitory computer readable medium of example 24, wherein the first power state cap corresponds to an efficient power state for the computing device and the second power state cap corresponds to less than the efficient power state.

Example 27 includes the non-transitory computer readable medium of any one of examples 20-26, wherein the instructions further cause the at least one processor to set a first background activity limit for the computing device when the first operation mode is selected, and set a second background activity limit for the computing device when the second operation mode is selected, the first background activity limit limiting background activity more than the second background activity limit.

Example 28 includes the non-transitory computer readable medium of any one of examples 19-27, wherein the instructions further cause the at least one processor to determine a presence of the user relative to the computing device based on the image data.

Example 29 includes the non-transitory computer readable medium of example 28, wherein the instructions further cause the at least one processor to select the first operation mode when the user is present and actively engaged with the computing device, and select the second operation mode when the user is present and passively engaged with the computing device.

Example 30 includes the non-transitory computer readable medium of example 28, wherein the instructions further cause the at least one processor to select the first operation mode when the user is present and engaged with the computing device, and select the second operation mode when the user is present but not engaged with the computing device.

Example 31 includes the non-transitory computer readable medium of example 28, wherein the instructions further cause the at least one processor to select the first operation mode when the user is absent and the computing device is implementing an ongoing user-initiated task, and select the second operation mode when the user is absent and no ongoing user-initiated task is being implemented.

Example 32 includes the non-transitory computer readable medium of any one of examples 19-31, wherein the plurality of operation modes includes a third operation mode associated with the computing device operating at a third performance level and a third power level, the third performance level being lower than the second performance level, the third power level being lower than the second power level.

Example 33 includes the non-transitory computer readable medium of example 32, wherein the instructions further cause the at least one processor to select the first operation mode when the user is actively engaged with computing device, select the second operation mode when the user is passively engaged with the computing device, and select the third operation mode when the user is not engaged with the computing device.

Example 34 includes the non-transitory computer readable medium of any one of examples 32 or 33, wherein the instructions further cause the at least one processor to detect the user is actively engaged with the computing device based on detection of user inputs received at the computing device.

Example 35 includes the non-transitory computer readable medium of any one of examples 32-34, wherein the instructions further cause the at least one processor to determine a direction of gaze of the user based on the image data, and determine whether the user is passively engaged or not engaged based on the direction of gaze of the user.

Example 36 includes the non-transitory computer readable medium of any one of examples 32-35, wherein the instructions further cause the at least one processor to determine whether the user is passively engaged or not engaged based on whether the application running on the computing device corresponds to an ongoing user-initiated task.

Example 37 includes a method to manage power consumption and performance of a computing device, the method comprising determining, by executing an instruction with at least one processor, an engagement of a user with the computing device based on at least one of image data generated by an image sensor of the computing device or an application running on the computing device, and selecting, by executing an instruction with the at least one processor, one of a plurality of operation modes for the computing device based on a level of engagement of the user in operation of the computing device, the plurality of operation modes including (1) a first operation mode associated with the computing device operating at a first performance level and a first power level and (2) a second operation mode associated with the computing device operating at a second performance level and a second power level, the first performance level being higher than the second performance level, the first power level being higher than the second power level.

Example 38 includes the method of example 37, further including setting a plurality of performance parameters associated with the computing device based on the selection of the first operation mode or the second operation mode.

Example 39 includes the method of example 38, further including assigning a first limit to a package power limit for the computing device when the first operation mode is selected, and assigning a second limit to the package power limit for the computing device when the second operation mode is selected, the first limit higher than the second limit.

Example 40 includes the method of any one of examples 38 or 39, further including assigning a first value to an energy performance preference parameter for the computing device when the first operation mode is selected, and assigning a second value to the energy performance preference parameter for the computing device when the second operation mode is selected, the first value indicating a higher priority is given to performance than the second value, the first value indicating a lower priority is given to power saving than the second value.

Example 41 includes the method of example 40, wherein the second value corresponds to a balance in priorities between performance and power saving.

Example 42 includes the method of any one of examples 38-41, further including setting a first power state cap for the computing device when the first operation mode is selected, and setting a second power state cap for the computing device when the second operation mode is selected, the first power state cap enabling higher power consuming power states than the second power state cap.

Example 43 includes the method of example 42, wherein the first power state cap does not limit available power states of the computing device and the second power state cap corresponds to an efficient power state for the computing device.

Example 44 includes the method of example 42, wherein the first power state cap corresponds to an efficient power state for the computing device and the second power state cap corresponds to less than the efficient power state.

Example 45 includes the method of any one of examples 38-44, further including setting a first background activity limit for the computing device when the first operation mode is selected, and setting a second background activity limit for the computing device when the second operation mode is selected, the first background activity limit limiting background activity more than the second background activity limit.

Example 46 includes the method of any one of examples 37-45, further including determining a presence of the user relative to the computing device based on the image data.

Example 47 includes the method of example 46, further including selecting the first operation mode when the user is present and actively engaged with the computing device, and selecting the second operation mode when the user is present and passively engaged with the computing device.

Example 48 includes the method of example 46, further including selecting the first operation mode when the user is present and engaged with the computing device, and selecting the second operation mode when the user is present but not engaged with the computing device.

Example 49 includes the method of example 46, further including selecting the first operation mode when the user is absent and the computing device is implementing an ongoing user-initiated task, and selecting the second operation mode when the user is absent and no ongoing user-initiated task is being implemented.

Example 50 includes the method of any one of examples 37-49, wherein the plurality of operation modes includes a third operation mode associated with the computing device operating at a third performance level and a third power level, the third performance level being lower than the second performance level, the third power level being lower than the second power level.

Example 51 includes the method of example 50, further including selecting the first operation mode when the user is actively engaged with computing device, selecting the second operation mode when the user is passively engaged with the computing device, and selecting the third operation mode when the user is not engaged with the computing device.

Example 52 includes the method of any one of examples 50 or 51, further including detecting the user is actively engaged with the computing device based on detection of user inputs received at the computing device.

Example 53 includes the method of any one of examples 50-52, further including determining a direction of gaze of the user based on the image data, and determining whether the user is passively engaged or not engaged based on the direction of gaze of the user.

Example 54 includes the method of any one of examples 50-53, further including determining whether the user is passively engaged or not engaged based on whether the application running on the computing device corresponds to an ongoing user-initiated task.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to manage power consumption and performance of a computing device, the apparatus comprising: an engagement detector to determine a level of engagement of a user with the computing device based on at least one of image data generated by an image sensor of the computing device or an application running on the computing device, the level of engagement of the user indicative of an interest of the user in operation of the computing device, the level of engagement corresponding to one of different levels of engagement, the different levels of engagement including the user being actively engaged, the user being passively engaged, and the user not being engaged, the user being passively engaged including at least one of (i) the user looking at the computing device without actively interacting with the computing device or (ii) the computing device implementing an ongoing user initiated task while the user is not actively interacting with the computing device; an operation mode selector is to select one of a plurality of operation modes for the computing device based on the level of engagement of the user, the plurality of operation modes including (1) a first operation mode associated with the computing device operating at a first performance level and a first power level and (2) a second operation mode associated with the computing device operating at a second performance level and a second power level, the first performance level higher than the second performance level, the first power level higher than the second power level; and a performance parameter manager to: set a first performance state cap for the computing device when the first operation mode is selected and set a second performance state cap for the computing device when the second operation mode is selected, the first performance state cap to enable higher power consuming performance states than the second performance state cap.

2. The apparatus of claim 1, wherein the performance parameter manager is to set a plurality of performance parameters associated with the computing device based on whether the operation mode selector selected the first operation mode or the second operation mode, the plurality of performance parameters including (i) at least one of the first performance state cap or the second performance state cap and (ii) another parameter different than the first performance state cap and different than the second performance state cap.

3. The apparatus of claim 2, wherein the performance parameter manager is to:
assign a first package power limit for the computing device when the first operation mode is selected; and
assign a second package power limit for the computing device when the second operation mode is selected, the first limit higher than the second limit.

4. The apparatus of claim 2, wherein the performance parameter manager is to:
assign a first value to an energy performance preference parameter for the computing device when the first operation mode is selected; and
assign a second value to the energy performance preference parameter for the computing device when the second operation mode is selected, the first value indicating a higher priority is given to performance than the second value, the first value indicating a lower priority is given to power saving than the second value.

5. The apparatus of claim 4, wherein the second value corresponds to a balance in priorities between performance and power saving.

6. The apparatus of claim 1, wherein the first performance state cap does not limit available performance states of the computing device and the second performance state cap corresponds to an efficient performance state for the computing device.

7. The apparatus of claim 1, wherein the first performance state cap corresponds to an efficient performance state for the computing device and the second performance state cap corresponds to less than the efficient performance state.

8. The apparatus of claim 2, wherein the performance parameter manager is to:
set a first background activity limit for the computing device when the first operation mode is selected; and
set a second background activity limit for the computing device when the second operation mode is selected, the first background activity limit to limit background activity more than the second background activity limit.

9. The apparatus of claim 1, further including a user presence detector to determine a presence of the user relative to the computing device based on the image data.

10. The apparatus of claim 9, wherein the operation mode selector is to:
select the first operation mode when the user is present and actively engaged with the computing device; and
select the second operation mode when the user is present and passively engaged with the computing device.

11. The apparatus of claim 9, wherein the operation mode selector is to:
select the first operation mode when the user is present and engaged with the computing device; and
select the second operation mode when the user is present but not engaged with the computing device.

12. The apparatus of claim 9, wherein the operation mode selector is to:
select the first operation mode when the user is absent and the computing device is implementing the ongoing user-initiated task; and
select the second operation mode when the user is absent and no ongoing user-initiated task is being implemented.

13. The apparatus of claim 1, wherein the plurality of operation modes includes a third operation mode associated with the computing device operating at a third performance level and a third power level, the third performance level being lower than the second performance level, the third power level being lower than the second power level.

14. The apparatus of claim 13, wherein the operation mode selector is to:
select the first operation mode when the user is actively engaged with the computing device;
select the second operation mode when the user is passively engaged with the computing device; and
select the third operation mode when the user is not engaged with the computing device.

15. The apparatus of claim 13, wherein the engagement detector includes a user interaction detector, the user interaction detector to detect the user is actively engaged with the computing device based on detection of user inputs received at the computing device.

16. The apparatus of claim 13, wherein the engagement detector includes a gaze detector, the gaze detector to:
determine a direction of gaze of the user based on the image data; and
determine whether the user is passively engaged or not engaged based on the direction of gaze of the user.

17. The apparatus of claim 13, wherein the engagement detector includes an application usage detector, the application usage detector to determine whether the user is passively engaged or not engaged based on whether the application running on the computing device corresponds to the ongoing user-initiated task.

18. The apparatus of claim 1, wherein the level of engagement corresponds to one of different levels of engagement, the different levels of engagement including the user being actively engaged, the user being passively engaged, and the user not being engaged.

19. The apparatus of claim 1, wherein the user being passively engaged includes the computing device implementing the ongoing user-initiated task while the user is not actively interacting with the computing device.

20. A non-transitory computer readable medium comprising instructions that, when executed, cause at least one processor to at least:
determine a level of engagement of a user with a computing device based on at least one of image data generated by an image sensor of the computing device or an application running on the computing device; and
select one of a plurality of operation modes for the computing device based on the level of engagement of the user, at least two different ones of the plurality of operation modes respectively associated with at least two different non-sleep states of the computing device, the plurality of operation modes including (1) a first operation mode associated with the computing device operating at a first performance level and a first power level and (2) a second operation mode associated with the computing device operating at a second performance level and a second power level, the first performance level higher than the second performance level, the first power level higher than the second power level, the first operation mode associated with a first setting for a package power limit for at least one of a processor or a system-on-a-chip in the computing device, the first operation mode associated with a second setting for a performance state cap for the at least one of the processor or the system-on-a-chip, the package power limit different than the performance state cap.

21. The non-transitory computer readable medium of claim 20, wherein the instructions further cause the at least one processor to determine a presence of the user relative to the computing device based on the image data.

22. The non-transitory computer readable medium of claim 21, wherein the instructions further cause the at least one processor to:
select the first operation mode when the user is present and actively engaged with the computing device; and
select the second operation mode when the user is present and passively engaged with the computing device.

23. The non-transitory computer readable medium of claim 21, wherein the instructions further cause the at least one processor to:
select the first operation mode when the user is present and engaged with the computing device; and
select the second operation mode when the user is present but not engaged with the computing device.

24. The non-transitory computer readable medium of claim 21, wherein the instructions further cause the at least one processor to:

select the first operation mode when the user is absent and the computing device is implementing an ongoing user-initiated task; and select the second operation mode when the user is absent and no ongoing user-initiated task is being implemented.

25. The non-transitory computer readable medium of claim 20, wherein the instructions further cause the at least one processor to:

set a first performance state cap for the computing device when the first operation mode is selected; and set a second performance state cap for the computing device when the second operation mode is selected, the first performance state cap enabling higher power consuming performance states than the second performance state cap.

26. The non-transitory computer readable medium of claim 25, wherein the first performance state cap does not limit available performance states of the computing device and the second performance state cap corresponds to an efficient performance state for the computing device.

27. A method to manage power consumption and performance of a computing device, the method comprising:

determining, by executing an instruction with at least one processor, a level of engagement of a user with the computing device based on at least one of image data generated by an image sensor of the computing device or an application running on the computing device; and selecting, by executing an instruction with the at least one processor, one of a plurality of operation modes for the computing device based on the level of engagement of the user, the plurality of operation modes including (1) a first operation mode associated with the computing device operating at any one of a first set of performance states and (2) a second operation mode associated with the computing device operating at any one of a second set of performance states, the first set of performance states including more performance states than the second set of performance states.

28. The method of claim 27, further including setting a plurality of performance parameters associated with the computing device based on the selection of the first operation mode or the second operation mode.

29. The method of claim 27, wherein the first operation mode is associated with a first setting for a package power limit for at least one of a processor or a system-on-a-chip in the computing device, and the first operation mode is associated with a second setting for a performance state cap for the at least one of the processor or the system-on-a-chip, the package power limit different than the performance state cap.

30. The method of claim 27, further including:

setting a first performance state cap for the computing device when the first operation mode is selected; and setting a second performance state cap for the computing device when the second operation mode is selected, the first performance state cap enabling higher power consuming performance states than the second performance state cap.

31. A compute device comprising:
an image sensor:
instructions;
processor circuitry to execute the instructions to:
determine a level of engagement of a user with the compute device based on at least one of image data generated by the image sensor or an application running on the computing device, the level of engagement of the user corresponding to one of a plurality of engagement levels including an actively engaged level, a passively engaged level, and a not engaged level, the actively engaged level corresponding to the user actively interacting with at least one of a keyboard, a mouse, or a touch sensitive component associated with the compute device;

select one of a plurality of operation modes for the compute device based on the level of engagement of the user, the plurality of operation modes including (1) a first operation mode associated with the compute device operating at a first performance level and a first power level and (2) a second operation mode associated with the compute device operating at a second performance level and a second power level, the first performance level higher than the second performance level, the first power level higher than the second power level;

set a first performance state cap for the compute device when the first operation mode is selected; and set a second performance state cap for the compute device when the second operation mode is selected, the first performance state cap enabling higher power consuming performance states than the second performance state cap.

32. The compute device of claim 31, wherein the processor circuitry is to:

assign a first limit to a package power limit for the compute device when the first operation mode is selected; and assign a second limit to the package power limit for the compute device when the second operation mode is selected, the first limit higher than the second limit.

33. The compute device of claim 31, wherein the processor circuitry is to:

assign a first value to an energy performance preference parameter for the compute device when the first operation mode is selected; and assign a second value to the energy performance preference parameter for the compute device when the second operation mode is selected, the first value indicating a higher priority is given to performance than the second value, the first value indicating a lower priority is given to power saving than the second value.

34. The compute device of claim 31, wherein different ones of the plurality of operation modes are associated with a non-sleep state of the compute device.

35. The compute device of claim 31, wherein the first performance level and the first power level correspond to any one of a first set of performance states, and the second performance level and the second power level correspond to any one of a second set of performance states, the first set of performance states including more performance states than the second set of performance states.

36. The compute device of claim 31, wherein the first operation mode associated with a first setting for a package power limit for at least one of a processor or a system-on-a-chip in the computing device, the first operation mode associated with a second setting for a performance state cap for the at least one of the processor or the system-on-a-chip, the package power limit different than the performance state cap.

* * * * *